(12) United States Patent
Jun et al.

(10) Patent No.: US 10,388,947 B2
(45) Date of Patent: Aug. 20, 2019

(54) PNICTIDE CONTAINING CATALYSTS FOR ELECTROCHEMICAL CONVERSION REACTIONS AND METHODS OF USE

(71) Applicants: The Regents of the University of California, Oakland, CA (US); Mitsubishi Chemical Corporation, Tokyo (JP)

(72) Inventors: Young-Si Jun, Goleta, CA (US); Jeffrey A. Gerbec, Oxnard, CA (US); Galen D. Stucky, Santa Barbara, CA (US)

(73) Assignees: THE REGENTS OF THE UNIVERSITY OF CALIFORNIA, Oakland, CA (US); MITSUBISHI CHEMICAL CORPORATION, Chiyoda-Ku, Tokyo (JP)

(*) Notice: Subject to any disclaimer, the term of this patent is extended or adjusted under 35 U.S.C. 154(b) by 14 days.

(21) Appl. No.: 14/615,782

(22) Filed: Feb. 6, 2015

(65) Prior Publication Data
US 2016/0233487 A1  Aug. 11, 2016

(51) Int. Cl.
| | |
|---|---|
| *H01M 6/04* | (2006.01) |
| *H01M 4/36* | (2006.01) |
| *H01M 10/052* | (2010.01) |
| *H01M 4/136* | (2010.01) |
| *H01M 4/58* | (2010.01) |
| *H01M 4/38* | (2006.01) |
| *H01M 4/13* | (2010.01) |
| *H01M 4/62* | (2006.01) |

(52) U.S. Cl.
CPC ............ *H01M 4/364* (2013.01); *H01M 4/13* (2013.01); *H01M 4/136* (2013.01); *H01M 4/38* (2013.01); *H01M 4/5815* (2013.01); *H01M 4/62* (2013.01); *H01M 10/052* (2013.01); *Y02P 70/54* (2015.11); *Y02T 10/7011* (2013.01)

(58) Field of Classification Search
CPC .... H01M 4/1393; H01M 4/587; H01M 4/625; H01M 4/133; H01M 4/364; H01M 4/384; H01M 4/13; H01M 4/136; H01M 4/38; H01M 4/5815; H01M 10/052; H01M 10/0525; Y02E 60/122; Y02P 70/54
See application file for complete search history.

(56) References Cited

U.S. PATENT DOCUMENTS

| | | | |
|---|---|---|---|
| 6,908,706 B2 | 6/2005 | Choi et al. | |
| 7,078,124 B2 | 7/2006 | Kim et al. | |
| 7,241,535 B2 | 7/2007 | Kim et al. | |
| 7,517,612 B2 | 4/2009 | Ryu et al. | |
| 2004/0157132 A1 | 8/2004 | Kim et al. | |
| 2013/0122344 A1 | 5/2013 | Visco et al. | |
| 2014/0141328 A1 | 5/2014 | Dai et al. | |
| 2014/0170459 A1 | 6/2014 | Wang et al. | |
| 2015/0104690 A1* | 4/2015 | Xiao ................ | H01M 2/145 429/145 |

FOREIGN PATENT DOCUMENTS

WO  WO 2015/001314  * 1/2015 ............ H01M 4/133

OTHER PUBLICATIONS

Algara-Siller et al. "Triazine-Based, Graphitic Carbon Nitride: a Two-Dimensional Semiconductor", Angew. Chem., 126, pp. 1-6, 2014.
Bojdys et al. "Ionothermal Synthesis of Crystalline, Condensed, Graphitic Carbon Nitride", Chem. Eur. J., 14, pp. 8177-8182, 2008.
Chong et al. "Tuning of galley heights in a crystalline 2D carbon nitride network", J. Mater. Chem. A, 1, pp. 1102-1107, 2013.
Pan. "Graphitic Carbon Nitride Nanotubes As Li-Ion Battery Materials: A First-Principles Study", J. Phys. Chem. C, 118, pp. 9318-9323, 2014.

* cited by examiner

*Primary Examiner* — Raymond Alejandro
(74) *Attorney, Agent, or Firm* — Gates & Cooper LLP

(57) ABSTRACT

Graphitic carbon nitride materials are shown to be useful in Lithium-Sulfur electrochemical cells. Batteries that include this material exhibit increased electrode kinetics of the lithium-sulfur electrochemical couple, phenomena that improve the specific capacity, usable lifetime and other desirable characteristics of these batteries. Lithium-sulfur batteries that incorporate these materials can be used to overcome a number of limitations in this technology.

18 Claims, 16 Drawing Sheets

PNICTIDE CONTAINING CATALYSTS FOR ELECTROCHEMICAL CONVERSION REACTIONS AND METHODS OF USE

TECHNICAL FIELD

The present invention relates generally to methods and materials useful with electrochemical cell systems.

BACKGROUND OF THE INVENTION

Electrochemical cells are widely in electrical energy storage devices because of their light weight relative to other types of batteries. For high power applications such as electric vehicles, there has been a continuing effort to improve the energy output and useful lifetime in such batteries in order to better suit such applications. Lithium-sulfur batteries have a theoretical capacity of 1675 mAhg$^{-1}$, nearly one magnitude higher than that of LiFePO$_4$ (theoretical capacity of 176 mAhg$^{-1}$), and hold great promise for such high power applications. The Li/S system has not been adapted for high power applications because of significant obstacles including the poor electrical conductivity of elemental sulfur and the intrinsic polysulfide shuttle, both of which contribute to capacity fade with cycling. After decades of intensive development, lithium ion batteries are still incapable of meeting the energy density requirements of many emerging applications. The exploration of new electrochemistry and new materials is thus necessary for the creation of high-energy battery systems.

There are a number of important classifications of redox reactions involved in electrochemical energy storage in Lithium ion batteries including "conversion" and "intercalation". While having fundamentally different reaction pathways, each type of reaction has the same goal, namely the storage of electrons to perform work-on-demand. The reversible conversion reaction is characterized by an alkali metal ion reducing an element or compound that undergoes a crystalline and morphology phase change over the course of oxidation-reduction typically associated with soluble intermediate species (crystalline sulfur reduced to amorphous lithium sulfide). The reversible intercalation reaction, commonly described as Li-ion, is characterized by an alkali metal ion insertion/de-insertion into a crystalline lattice changing the oxidation state of a host lattice transition metal ion (lithium cobalt oxide, Co$^{2+}$/Co$^{3+}$).

The advancement of Li/S battery technology has not progressed as rapidly as conventional Li-ion batteries. The primary reasons for this is rooted in the complex nature of the electrochemical conversion reaction: 1) intermediate lithium polysulfides (Li$_2$S$_x$, 8≥x≥6) are soluble in the electrolyte which diffuse out of the cathode resulting in irreversible capacity loss, 2) these soluble polysulfides create a phenomena known as a redox shuttle where the cell can never reach full charge capacity (cannot achieve elemental sulfur from oxidation of lithium sulfide), 3) electronic insulating nature of sulfur increases charge transfer resistance in the cathode limiting the redox cycle rate capability, 4) extreme volume change from sulfur to lithium sulfide (nearly 400%) pulverizes the cathode over many charge-discharge cycles, 5) low order polysulfides (Li$_2$S$_x$, 6≥x≥1), can precipitate out of the electrolyte making the oxidation step unfavorable, requiring high over-potentials to drive the oxidation. Combined, the resultant electrochemical cell is sluggish, short lived and far from practical. In addition, the electrical conductivity of elemental sulfur can be as low as 5×10$^3$ S/cm at 25° C. Such a low conductivity causes poor kinetics leading to low utilization of active materials in the cathode. Although compositing elemental sulfur with carbon or conducting polymers can improve the electrical conductivity of sulfur-containing cathodes, the porous structure of the cathode still needs optimization to facilitate the transport of ions while retaining the integrity of the cathode after dissolution of sulfur at the discharge cycle.

There is a need in the art for batteries with improved performance, particularly with respect to initial discharge capacities, cycling performance, rate capability, and electrical power output (i.e., improved power density), as well as improved usable lifetime.

SUMMARY OF THE INVENTION

The instant disclosure describes graphitic carbon nitride (g-CN) materials that can be used as solid state redox catalysts for electrochemical reactions such as those involved in the Lithium-sulfur (Li/S) battery electrochemical couple. As discussed in detail below, these g-CN materials can, for example, be used to increase the electrode kinetics of the lithium-sulfur electrochemical couple by reducing the electrode charge transfer resistance. These g-CN materials can further act as a sorbent to bind soluble polysulfides, thereby limiting their bulk diffusion into the electrolyte. Moreover, these g-CN materials are shown to possess flexible, three-dimensional hierarchical structures that are suitable for the large strain/stress induced by the volume expansion that results from the conversion of S$_8$ into Li$_2$S in Lithium-sulfur batteries. Finally, the graphitic carbon nitride (g-CN) materials of the invention are non-toxic and can be readily made from sustainable feed stocks such as dicyandiamide, urea, melamine and many other nitrogen rich molecules.

The invention disclosed herein has a number of embodiments that utilize pnictide materials having catalytic activity toward metal-sulfur electrochemical couple. Typically, the material is a graphitic carbon nitride compound having the formula:

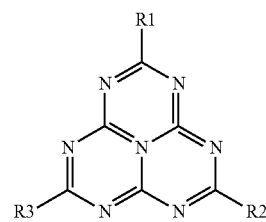

wherein:
R1, R2 and R3 are each independently:
(a) —NH$_2$;
(b) —NH—R4; or
(c) —N—(R4)$_2$; and R4 is:

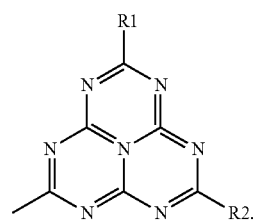

Typically these graphitic carbon nitride compounds are electrically insulative compounds and, for example, have an electrical conductivity<$1\times10^{-7}$ S/cm. Exemplary embodiments of these graphitic carbon nitride materials are shown in Scheme 1 of FIG. 1.

The graphitic carbon nitride compounds can be used to form a variety of materials useful in electrochemical cells. In certain embodiments of the invention, the graphitic carbon nitride is disposed within a composite material, for example one that forms a component of an electrochemical cell such as the cathode. Optionally, the graphitic carbon nitride is disposed within such a composite material comprising at least one of: reduced graphene oxide, graphene oxide, lithium bromide or lithium iodide and conducting polymers such as polyaniline (PANi), polypyrrole (PPy), polythiphene (PTH) and poly(3,4-ethylenedioxythiophene) (PEDOT). Illustrative embodiments of the invention include compositions of matter comprising graphitic carbon nitride combined with Sulfur, a nonporous conductive carbon nanoparticles (e.g. ones having an average diameter between 80 nanometers and 10 micrometer), and a polymeric material so as to form a composite. In certain embodiments of the invention, the graphitic carbon nitride is doped with at least one of: Sulfur, Carbon, Phosphorus, or Boron. Some embodiments of the invention include compositions comprising lithium polysulfides, for example lithium polysulfides bound to a graphitic carbon nitride as disclosed herein. In typical embodiments of the invention, the graphitic carbon nitride catalyzes the oxidation or reduction of lithium polysulfides.

Embodiments of the invention are simple to use and adapted to be compatible with a number of conventional agents and elements in this technology. Illustrative embodiments of the invention include an electrochemical cell comprising an anode, a cathode, a separator disposed between the anode and the cathode, an electrolyte solution, Sulfur and a graphitic carbon nitride compound. In certain embodiments, the graphitic carbon nitride is disposed at a location in the electrochemical cell selected to allow it to perform a desired function, for example to act as a sorbent of soluble polysulfides, thereby limiting their diffusion within the battery. In some embodiments of the invention, the electrochemical cell has a membrane disposed between the separator and the cathode, one comprising a graphitic carbon nitride compound. In some embodiments of the invention, the cathode material includes a graphitic carbon nitride compound. Embodiments of the invention include such graphitic pnictide containing material employed in half-electrochemical cell and/or a full-electrochemical cell. In certain embodiments of the invention, the electrochemical cell comprises a lithium-sulfur battery. Optionally for example, the electrochemical cell generates lithium polysulfides; and the graphitic carbon nitride is disposed in the cell so that the lithium polysulfides contact and bind the graphitic carbon nitride.

Embodiments of the invention include methods of using the graphitic carbon nitrides disclosed herein to modulate electrochemical reactions within a electrochemical cell. Illustrative embodiments of these methods include a method for modulating electrochemical reactions within a Lithium-Sulfur battery by combining lithium polysulfides formed in the battery with graphitic carbon nitride, and allowing the graphitic carbon nitride to catalyze the oxidization or reduction of the lithium polysulfides, so that the electrochemical reactions within the Lithium-Sulfur battery are modulated. Optionally, for example, the methods use graphitic carbon nitride in a membrane that is disposed between the separator and the cathode. In these methods, the graphitic carbon nitride material can be combined with a polymeric binder and other compounds to form a composite. Optionally, the graphitic carbon nitride is disposed in a composite comprising at least one of: reduced graphene oxide, graphene oxide, and conducting polymers such as polyaniline (PANi), polypyrrole (PPy), polythiphene (PTH) and poly(3,4-ethylenedioxythiophene) (PEDOT) graphene, graphite oxide, lithium bromide, lithium iodide, a alkali metal halide immobilized within graphitic carbon nitride, or a polymeric binding composition. In typical methodological embodiments of the invention, the graphitic carbon nitride is disposed at a location within the battery that allows the material to act as a sorbent to attract and/or bind soluble polysulfides and limit their bulk diffusion into the electrolyte solution, and/or to catalyze oxidation-reduction reactions in a lithium sulfur catholyte, and/or to catalyze oxidation-reduction of a crystalline lithium sulfide, and/or to catalyze oxidation-reduction of a crystalline sulfur, and/or to increase the electrode kinetics of a lithium-sulfur electrochemical couple by reducing electrode charge transfer resistance.

Embodiments of the invention further include methods for making and using compositions comprising an alkali metal halide immobilized within graphitic carbon nitride. One such embodiment of the invention is methods of forming a composition of matter comprising an alkali metal halide immobilized within graphitic carbon nitride (g-CN-M). Such methods comprise combining a graphitic carbon nitride precursor with at least one alkali metal halide composition selected from the group consisting of LiCl:KCl, LiBr:KBr, LiI:KI; and A wt % LiBr:KBr+B wt % LiI:KI, wherein A wt %+B wt %=100 wt %. In such methods, the combination is then for at least 4 hours at a temperature of at least 500° C. but below 600° C. so as to form amorphous g-CN-M having a general formula:

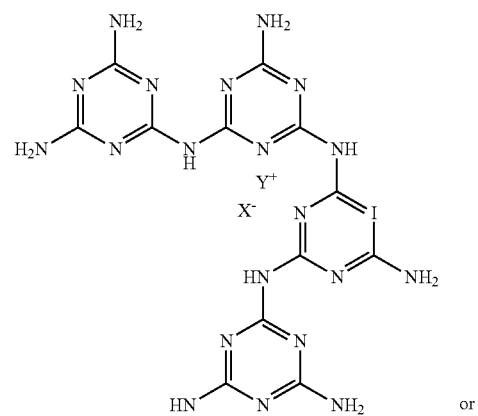

or

-continued

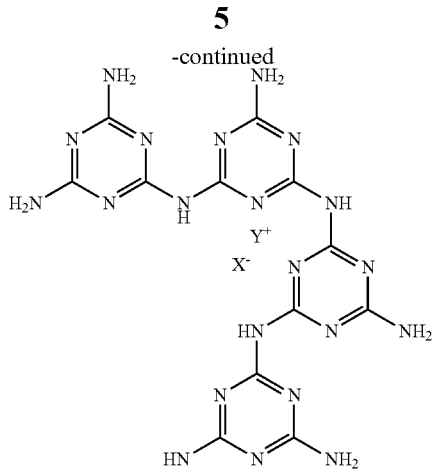

wherein X⁻ is Iodine, Bromine or Chlorine, and Y⁺ is Lithium or Potassium.

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

FIG. 12A shows graphed data with PTI-LiKX, FIG. 12A shows a Survey scan. FIGS. 12C-12E shows High resolution XPS spectral data from Cl 2p (FIG. 12C), Br 3p (FIG. 12D) and I 3d (FIG. 12E).

DETAILED DESCRIPTION OF THE INVENTION

Unless otherwise defined, all terms of art, notations, and other scientific terms or terminology used herein are intended to have the meanings commonly understood by those of skill in the art to which this invention pertains. In some cases, terms with commonly understood meanings may be defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. A number of terms are defined below.

Figure 1A:
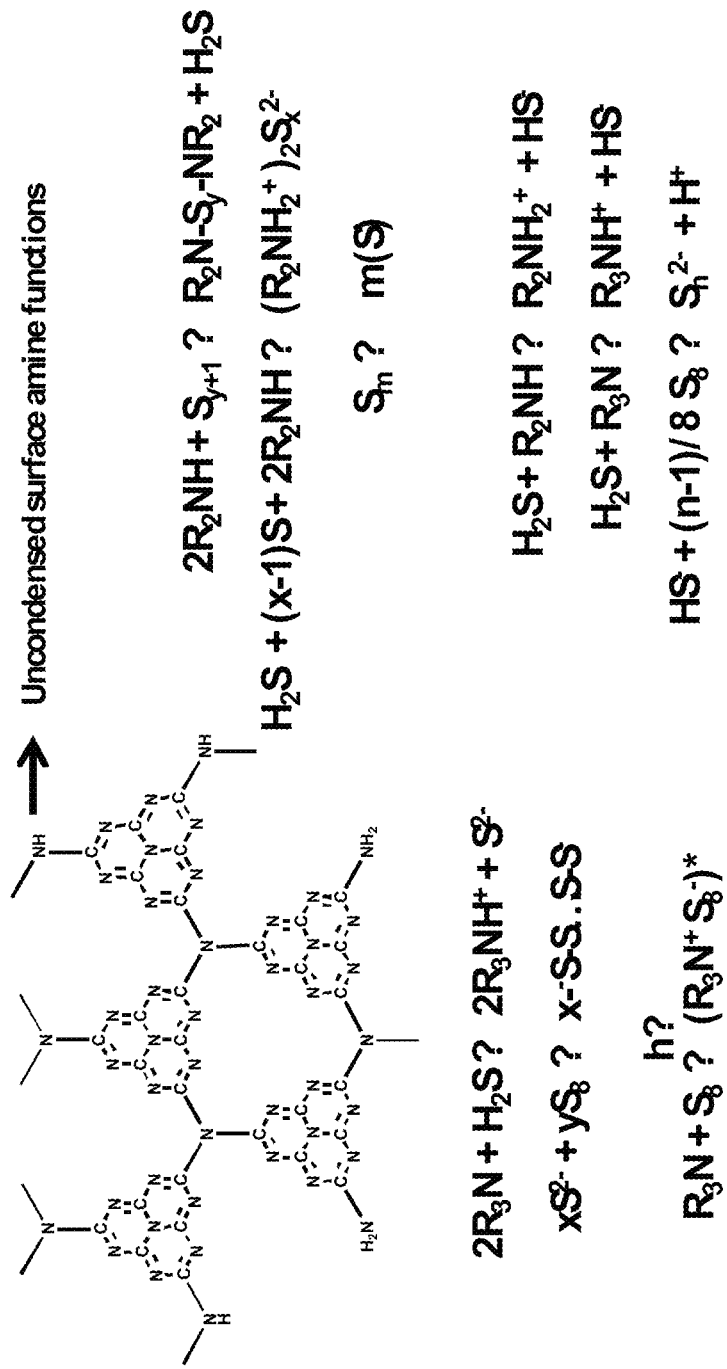
FIG. 1A (Scheme 1) identifies reactions of tri-s-triazine based g-CN with sulfur and H₂S.

As noted above, Lithium-Sulfur Batteries (LSB) typically suffer from capacity degradation. This is mainly due to 1) the sulfur loss from the cathode and 2) the irreversible deposition (or electrical isolation) of $Li_2S$ or S in the composite cathode structure. The instant disclosure provides methods and materials that can be used to mitigate these problems by identifying electrocatalysts which have ability to bind target substrates, lithium polysulfides, and catalyze their reduction and oxidation reactions at the same site without losing binding. The reaction between sulfur and amino functional groups (primary, secondary, and tertiary amines) has been extensively investigated in order to understand the mechanism of the Willgerodt-Kindler (WK) reaction.[1] WK reaction is utilized to convert an aryl alkyl ketone to the corresponding amide in the presence of thiation agent, $S_8$, and base catalysts, amine, where the first step involves the nucleophilic attack of amines to elemental sulfur, $S_8$.[2] Although the reaction products for various amines are not fully elucidated yet due to their low stability and difficulty in isolation, it is generally suggested that primary and secondary amines convert S, ring into linear ammonium polysulfides, polythiobisamines or sulfur radicals.[3] (Scheme 1, FIG. 1A) These linear sulfur species react much faster than S, ring, which facilitates the formation (or dissociation) of S—S bonds to extend (or reduce) the sulfur polymer chain.[4] Furthermore, S, ring can be quantitatively recovered from the primary and secondary amine solutions by the addition of diluted hydrochloric acids.[1] On the other hand, tertiary amines alone are inert to S, under normal conditions. It is, however, possible for tertiary amines to induce the similar reactions forming ammonium polysulfides by addition of $H_2S$ or reversibly forming the contact ion charge transfer complex, $(R_3N^+S_8^-)^*$, by photoexcitation.[5]

The invention disclosed herein has a number of embodiments that utilize pnictide materials having catalytic activity toward metal-sulfur electrochemical couple. Typically, the material is a graphitic carbon nitride compound having the formula:

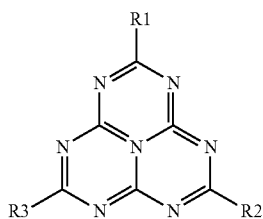

wherein:
R1, R2 and R3 are each independently:
(a) —$NH_2$;
(b) —NH—R4; or
(c) —N—$(R4)_2$; and R4 is:

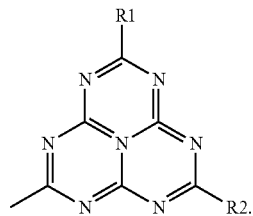

Typically these graphitic carbon nitride compounds are electrically insulative compounds and, for example, have an electrical conductivity<$1 \times 10^{-7}$ S/cm due to the presence of more electronegative N (~50 wt %) localizing conducting electrons. Exemplary embodiments of these graphitic carbon nitride materials are shown in Scheme 1 of FIG. 1. These graphitic carbon nitride compounds have different electronic structures (optical bandgap of 2.7 eV) and properties that are unlike other carbon nitrogen compounds used in somewhat similar contexts (see, e.g. the electron conducting compositions disclosed in U.S. Patent No. 2014/0141328).

As discussed in the Examples below, another desirable feature of the graphitic carbon nitride compounds disclosed herein is the observation that physical features which influence their function can be readily manipulated and embodiments of the invention include a graphitic pnictide containing material with tunable surface area. In this context, in some embodiments of the invention, g-CN particles are formulated to exhibit a specific surface area and/or to exhibit open and porous structures that readily allow volume expansions and/or to form sheet like structures having mesopores of a certain size range etc. For example, embodiments of the invention include sheet-like structures possessing mesopores having an average diameter around 90~120 nm. (see, e.g. FIG. 2 and Table 1). Without being bound by a particular theory or mechanism of action, it is believe that materials formed to have a high surface is more favorable due to: 1) access to nitrogen heteroatoms, 2) favorable mechanical response to volumetric stress during phase change from sulfur to lithium sulfide. Such open porous, 3D architectures accommodate the volume expansion that results from the conversion of $S_8$ into $Li_2S$ (e.g. at least a 100% or 200% volume expansion).

The graphitic carbon nitride compounds can be used to form a variety of materials useful in electrochemical cells. In certain embodiments of the invention, the graphitic carbon nitride is disposed within a composite material, for example one that forms a component of an electrochemical cell such as the cathode. Optionally, the graphitic carbon nitride is disposed in a composite material comprising at least one of: reduced graphene oxide, graphene oxide, and conducting polymers such as polyaniline (PANi), polypyrrole (PPy), polythiphene (PTH) and poly(3,4-ethylenedioxythiophene) (PEDOT). Illustrative embodiments of the invention include compositions of matter comprising an alkali metal halide immobilized within graphitic carbon nitride (g-CN-M). Illustrative embodiments of the invention also include compositions of matter comprising graphitic carbon nitride combined with Sulfur, a nonporous conductive carbon nanoparticles (e.g. ones having an average diameter between 80 nanometers and 10 micrometer), and a polymeric material so as to form a composite. In certain embodiments of the invention, the graphitic carbon nitride is doped with at least one of: Sulfur, Carbon, Phosphorus, or Boron. Some embodiments of the invention include lithium polysulfides, for example lithium polysulfides bound to the graphitic carbon nitride. In typical embodiments of the invention, the graphitic carbon nitride catalyzes the oxidation or reduction of lithium polysulfides.

Figure 7:
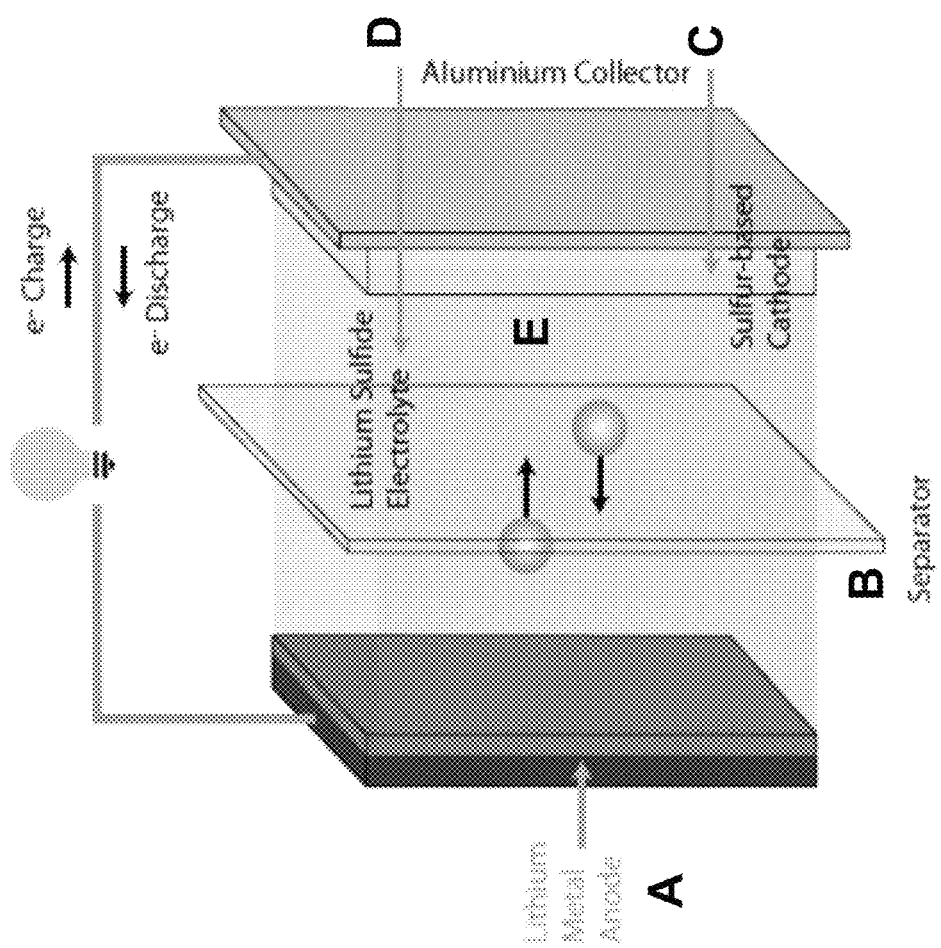
FIG. 7 shows a diagram of a schematic configuration of a Li/S cell with active sulfur species containing electrolyte, sulfur-carbon cathode, and lithium anode.
Figure 8:
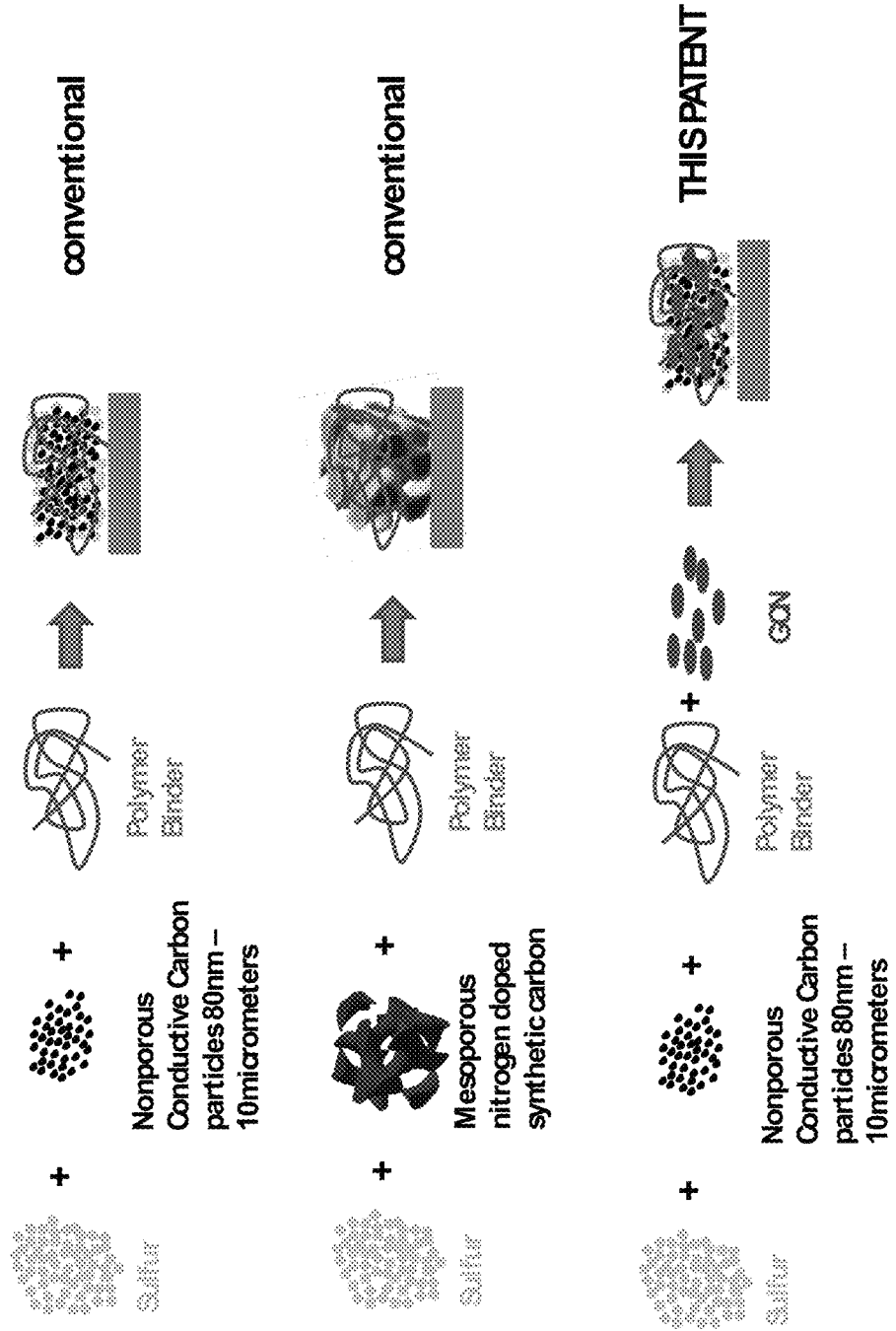
FIG. 8 provides a diagram showing two conventional composite cathodes (top) and a g-CN composite cathode as disclosed herein (bottom).
Figure 9:
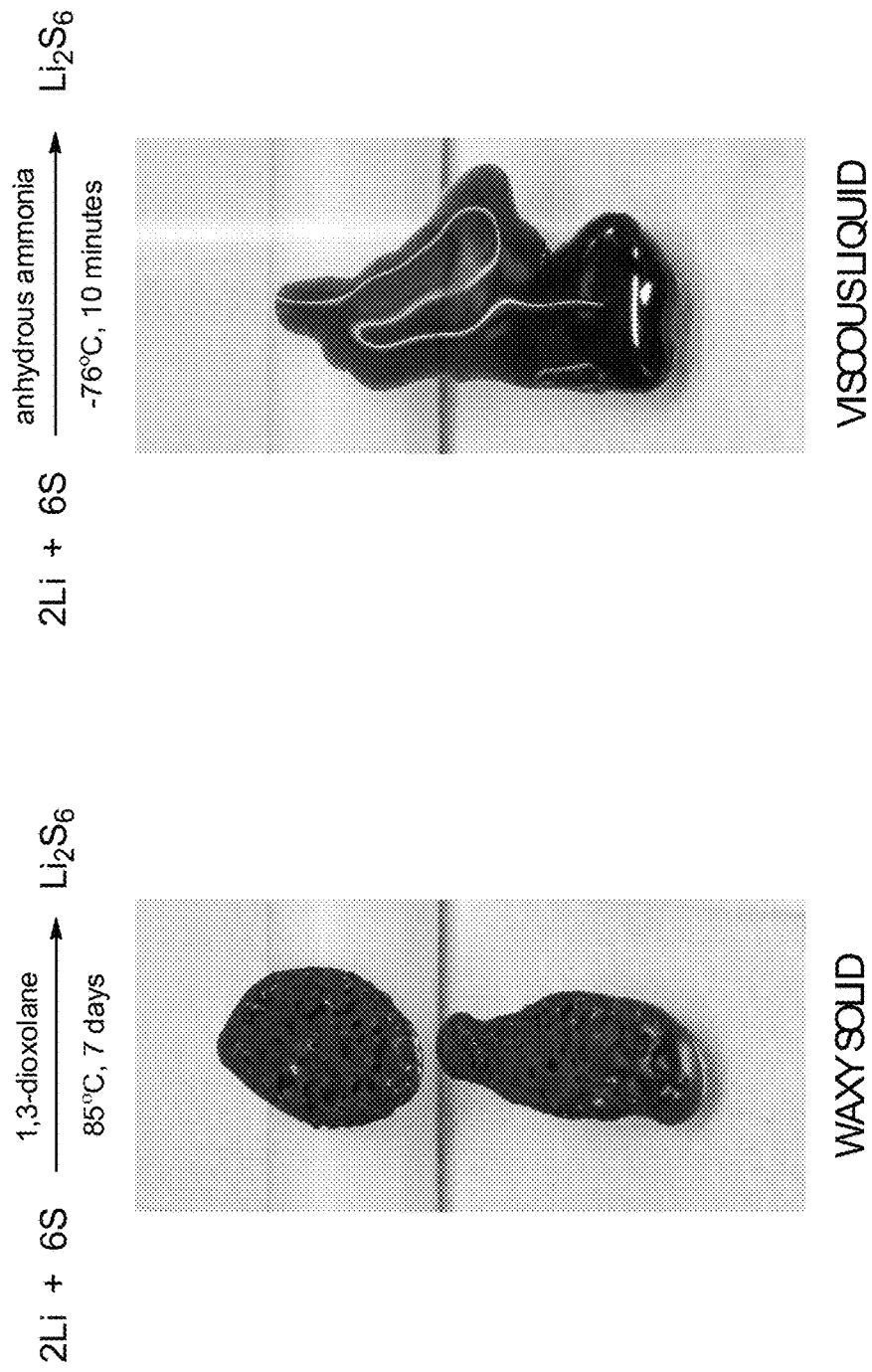
FIG. 9 provides reaction schematics and photographs of synthetically prepared, isolated lithium polysulfides.
Figure 10A:
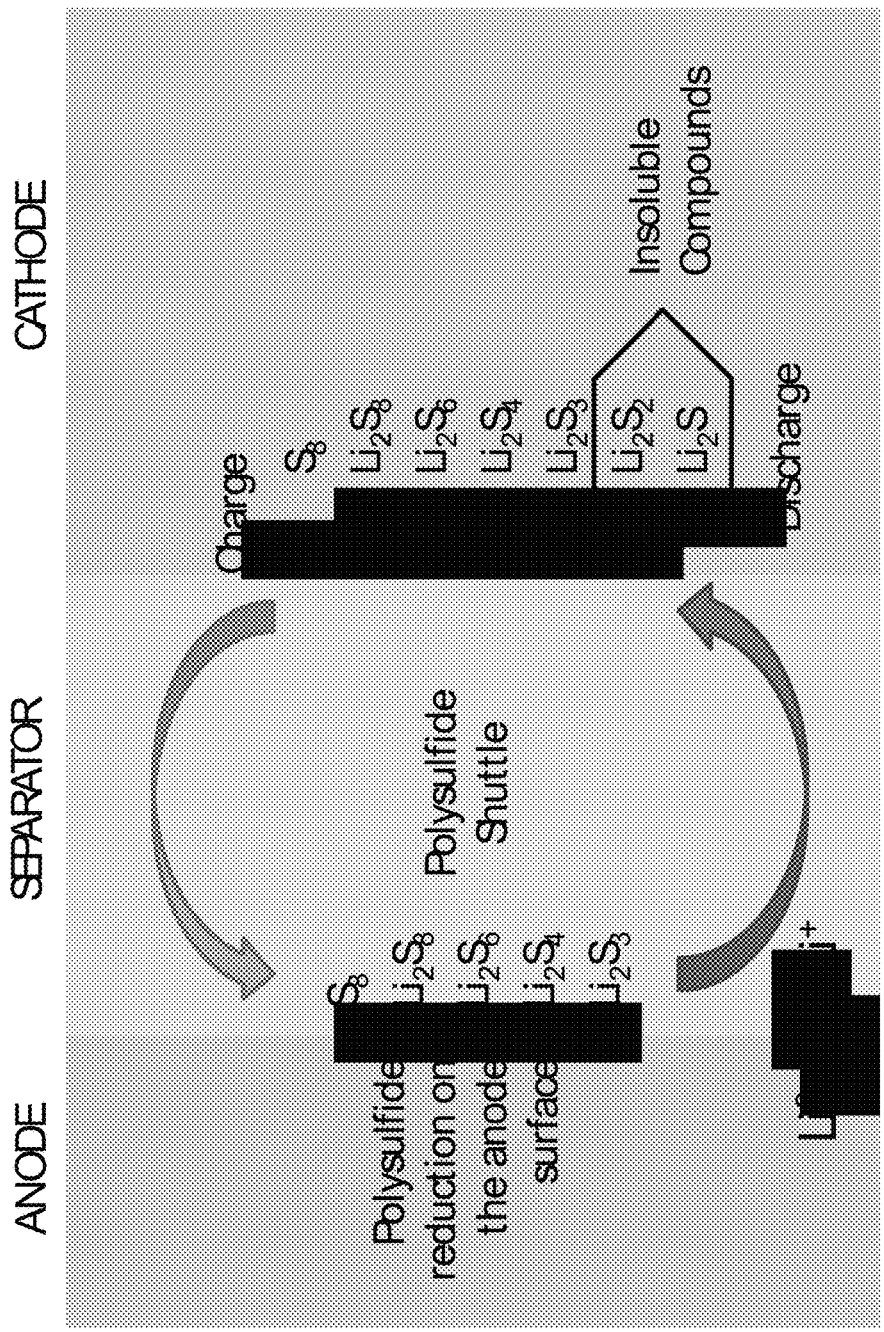
FIG. 10A shows a diagram of polysulfide redox shuttle processes that are believed to be hindering the commercialization of Li/S batteries.
Figure 10B:
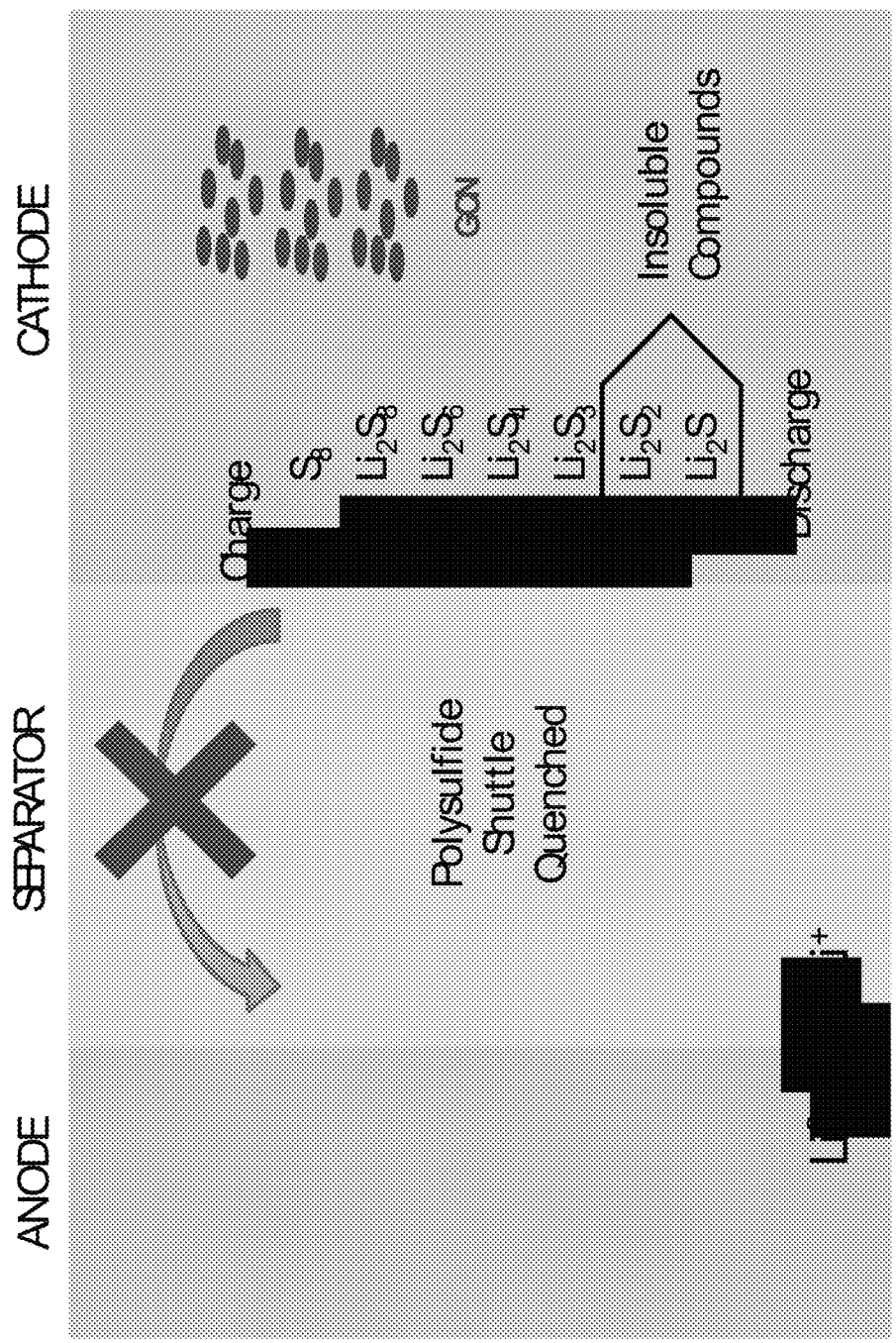
FIG. 10B shows a diagram of how the g-CN materials disclosed herein are believed to overcome some of these problematical polysulfide redox shuttle processes (photographically demonstrated in FIG. 6).

Embodiments of the invention include electrochemical cells that utilize the graphitic carbon nitrides disclosed herein. By way of illustration, FIG. 7 shows a diagram of an embodiment of a Li/S cell with active sulfur species containing electrolyte, sulfur-carbon cathode, and lithium anode. Table 3 below shows illustrative elements in such cells and associated elements. Illustrative embodiments include an electrochemical cell comprising an anode, a cathode, a separator disposed between the anode and the cathode, an electrolyte solution, Sulfur and a graphitic carbon nitride compound. In certain methods, the graphitic carbon nitride is disposed at a location in the electrochemical cell selected to allow it to perform a desired function, for example to act as a sorbent of soluble polysulfides, thereby limiting their diffusion within the battery. In some embodiments of the invention, the electrochemical cell has a membrane disposed between the separator and the cathode that includes graphitic carbon nitride. In certain embodiments of the invention, the cathode material includes graphitic carbon nitride. Embodiments of the invention include such graphitic pnictide containing material employed in both a half-electrochemical cell as well as a full-electrochemical cell. In embodiments of the invention, the electrochemical cell can comprise a lithium-sulfur cell, a sodium-sulfur cell, a magnesium-sulfur cell, or a calcium-sulfur cell.

In certain embodiments of the invention, the electrochemical cell comprises sulfur in combination with g-CN. The sulfur and g-CN can be disposed in an electrochemical conversion cells in a variety of forms using a variety of methods known in the art. In one embodiment, bulk sulfur is disposed in the cell by compounding cyclo-octasulfur directly with g-CN, conductive carbon (typically with other constituents) in order to yield a composite cathode. It another embodiment, sulfur is disposed by compounding lithium sulfide (the fully reduced form of sulfur) directly with g-CN, conductive carbon (typically with other constituents) in order to yield a composite cathode. In yet another embodiment of the invention, sulfur is present in a supporting electrolyte (commonly referred to as a catholyte) wherein partially reduced sulfur in the form of lithium polysulfides is compounded with the electrolyte yielding a homogenous solution having a composite cathode consisting of g-CN, conductive carbon (and typically other constituents). U.S. patent publications 20010041294 and 20130141050, the contents of which are incorporated herein by reference, describe battery embodiments where sulfur is present in a supporting electrolyte In illustrative embodiments of the invention, the electrochemical cell generates lithium polysulfides; and the graphitic carbon nitride is disposed in the cell so that the lithium polysulfides contact and bind the graphitic carbon nitride. In embodiments of the invention, the graphitic carbon nitride is disposed at a location in the battery so as to act as a sorbent to attract and/or bind soluble polysulfide compounds and limit their bulk diffusion into the electrolyte solution and/or to catalyze oxidation-reduction reactions of a lithium sulfur catholyte and/or to catalyze oxidation-reduction of a crystalline lithium sulfide and/or to catalyze oxidation-reduction of a crystalline sulfur and/or to increase the electrode kinetics of a lithium-sulfur electrochemical couple by reducing electrode charge transfer resistance.

Embodiments of the invention include methods of using the graphitic carbon nitrides disclosed herein to modulate electrochemical reactions within a electrochemical cell. Illustrative embodiments of these methods include a method for modulating electrochemical reactions within a Lithium-Sulfur battery. These methods can include, for example, combining lithium polysulfides formed in the battery with graphitic carbon nitride allowing the graphitic carbon nitride to catalyze the oxidization or reduction of the lithium polysulfides, so that the electrochemical reactions within the Lithium-Sulfur battery are modulated. In typical methodological embodiments of the invention, the graphitic carbon nitride is disposed at a location within the battery that allows the material to act as a sorbent to attract and/or bind soluble polysulfides and limit their bulk diffusion into the electrolyte solution, and/or to catalyze oxidation-reduction reactions in a lithium sulfur catholyte, and/or to catalyze oxidation-reduction of a crystalline lithium sulfide, and/or to catalyze oxidation-reduction of a crystalline sulfur, and/or to increase the electrode kinetics of a lithium-sulfur electrochemical couple by reducing electrode charge transfer resistance. Optionally, for example, the methods use graphitic carbon nitride in a membrane that is disposed between the separator and the cathode. Illustrative embodiments of the invention include compositions of matter comprising an alkali metal halide immobilized within graphitic carbon nitride (g-CN-M). In these methods, the graphitic carbon nitride material can be combined with a polymeric binder and other compounds to form a composite. Optionally, the graphitic carbon nitride is disposed in a composite comprising at least one of: reduced graphene oxide, graphene oxide, and conducting polymers such as polyaniline (PANi), polypyrrole (PPy), polythiphene (PTH) and poly(3,4-ethylenedioxythiophene (PEDOT) or a polymeric binding composition.

Additional embodiments of this method, graphitic carbon nitride is disposed in a conductive carbon matrix in a certain weight fraction, bound with a polymer to an aluminum substrate forming a composite structure whereby the "sulfur active material" is added to the cell in liquid form consisting of a solution of organic solvent and lithium salt (supporting electrolyte) and solubilized lithium polysulfides collectively, typically referred to as a "catholyte". Lower order polysulfides ($Li_2S_x$, $4 \geq x \geq 1$) are preferable, $Li_2S_x$, $6 \geq x \geq 4$ polysulfides are more preferable and high order polysulfides ($Li_2S_x$, $8 \geq x \geq 6$) are most preferred. Additionally, maximizing the total gravimetric energy density of the cell is most desirable. This can be achieved by concentrating the molality "y" of high order polysulfides ($Li_2S_8$); $0.001 \leq y \leq 0.10$ is preferable, $0.11 \leq y \leq 2.0$ is more preferable, $2.1 \leq y \leq 5.0$ is most preferred.

In further embodiments, choice of electrochemical conditioning of catholyte cells, vida supra, influences the specific gravimetric capacity of said cells. The initial conditions of said cell at room temperature shows an open circuit potential between 2.1V and 2.4V is understood to have an intermediate state of charge (SOC), partially discharged. This potential is maintained over days, weeks and months indicating no unfavorable side reactions (self-discharge) or parasitic reactions (decomposition or corrosion) of cell constituents elements. The initial bias applied either charges (positive applied current) or discharges (negative applied current) said cell. Conditioning said cell with a negative bias (discharging) is preferable; conditioning with a positive bias (charging) is most preferred. Furthermore, the applied bias in the range of +0.37 mA/cm$^2$ is preferable, +7.3 mA/cm$^2$ is more preferable and +0.73 to +1.5 mA/cm$^2$ is most preferred to achieve the highest specific capacity.

Embodiments of the invention are simple to use and adapted to be compatible with a number of conventional agents and elements in this technology. Conventional methods, elements and materials in this technology can be adapted for use with embodiments of the invention disclosed herein. The electrochemical cells described herein such as lithium-sulfur batteries can be manufactured by any assembling technique known in the art or in any known shape of battery using the positive electrode. The shape of a battery can vary according to applications of the battery, and detailed examples thereof include, but are not limited to, a thin-film battery having a porous separator, a spirally wound jelly-roll type battery, a prismatic battery, a coin-shaped battery, a flow-cell type, stack type cell and bi-polar type cell. Conventional methods, elements and materials in this technology are described, for example, in U.S. Pat. Nos. 6,908,706, 7,078,124, 7,241,535, and 7,517,612, and U.S. Patent Application Publication Nos. 2004/0157132, 2014/0141328, 2013/0122344, and 2014/0170459, the content of which are incorporated by reference herein.

In illustrative embodiments of the invention, the electrochemical cell is a Li/S battery having a negative electrode that includes at least one negative active material selected from the group consisting of lithium, sodium, lithium alloy, lithium intermetallic, sodium alloy, and a lithium/inactive sulfur compound. The negative electrode is typically spaced a predetermined distance apart from the positive electrode according to the present invention, and a separator is interposed between the positive and negative electrodes. The two electrodes are attached to a conductive substrate by any method, thereby inducing current to an external circuit through a current collector. Commonly, all components of the battery, including the positive electrode and the negative electrode, are sealed by means of an appropriate casing, such as plastic or a multi-layer aluminum pouch, with the conductive substrate protruding outward. In such a manner, reactive elements including sodium or lithium used as a negative active material and other battery components can be protected.

In embodiments of the invention, any separator commonly used in such batteries may be used without limitations. Suitable examples of such a separator include a polyethylene separator, a polypropylene separator, a polyvinylidene fluoride separator, a vinylidene fluoride-hexafluoroprolylene (VDF-HFP) copolymer separator, a bilayer polyethylene/polypropylene separator, a triple layer polypropylene/polyethylene/polypropylene separator, a triple layer polyethylene/polypropylene/polyethylene separator, ceramic powder coated porous resin film and the like. The electrolyte solutions used in the electrochemical cells that utilize the graphitic carbon nitrides disclosed herein can comprise conventional agents including at least one of: glyme, an ether, a fluorinated ether, a phosphate, a fluoride, a tetrafluoroborate, a bis(trifluoromethanesulfonyl)imide, a bis(fluorosulfonyl)imide, a nitrate, a cyanate, a pyridinic, a thiocyanate alkali, or an alkaline earth metal salt. Further including "gel-type" electrolytes of the aforementioned constituents where polymers are employed like polyvinylidene fluoride and polyethylene oxide. Even further including "solid-state" electrolytes of the oxide and sulfide class for example. Embodiments of the invention include such graphitic pnictide containing material employed in both a half-electrochemical cell as well as a full-electrochemical cell.

Embodiments of the invention include methods for manufacturing a lithium-sulfur battery employing the g-CN materials disclosed herein and methods of conditioning. For example, a positive active material either elemental sulfur or lithium octasulfide, a conductive agent, g-CN, a binder and a solvent can mixed to prepare a positive active material composition. Usable examples of the conductive agent and the binder are described herein. Usable examples of such a solvent include, but are not limited to, acetonitrile, N-methyl-2-pyrrolidone (NMP), isopropyl alcohol, tetrahydrofuran, carbon disulfide, tetraglyme, dibutyl phthalate, acetone, and the like.

Figure 4:
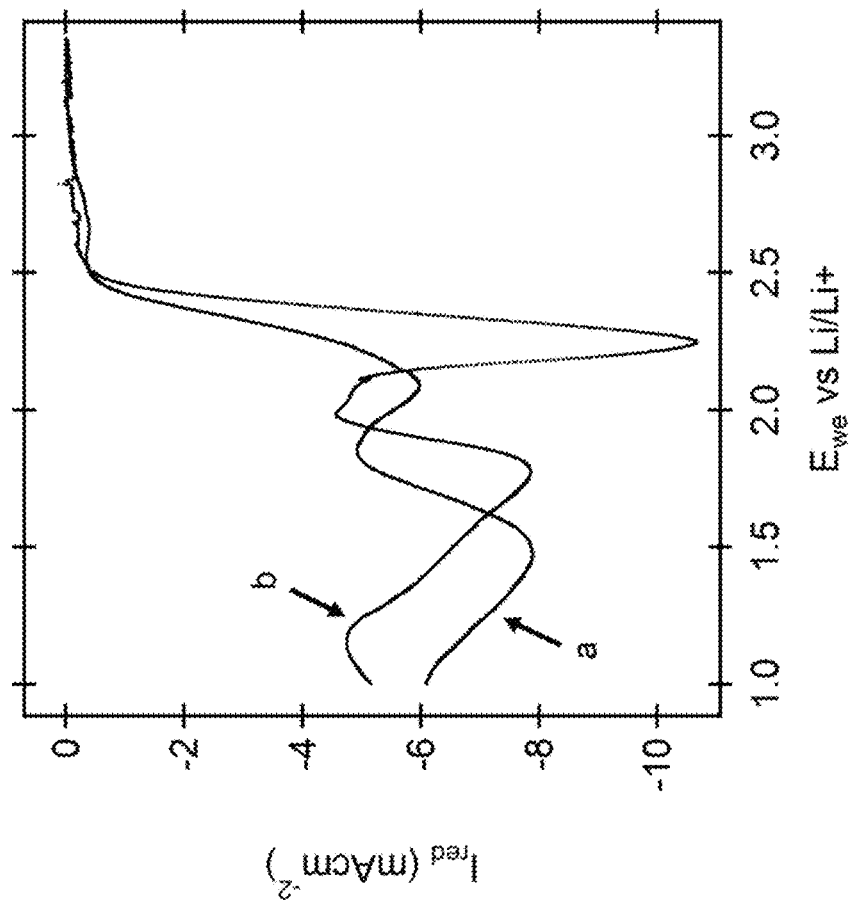
FIG. 4 provides data in graphical format showing characteristic reduction signatures of a two-electrode lithium sulfur electrochemical Swagelok-type™ cell having sulfur/carbon as the working electrode and lithium foil as the counter electrode where this second scan was collected at 0° C. at a scan rate of 1 mVs-1; trace (a) represents the control cell having a cathode composition of 34 wt % sulfur/8 wt % Super P/58 wt % ketjen black and trace (b) represents a cell having a cathode composition 34 wt % sulfur/10 wt % Supre P/56 wt % g-CN-2.

Certain embodiments relate to improved low temperature electrode reactions (e.g. reactions below 40° C., 30° C. or 20° C.). Factors influencing electrode reaction rate and current include mass transfer, heterogeneous chemical reactions, electron transfer at the electrode surface and various surface reactions like adsoption/desorption. When a steady state current is reached, reaction rates of all processes are the same. The magnitude of this current is often limited by the sluggishness of one or more reactions typically referred to as the "rate determining step". Furthermore, each value of the current density is represented by a characteristic over potential (excess potential needed to drive an electrochemical process at a desired rate). Thus, the over potential can be considered as a sum of terms associated with the chemical conversion at the electrode (mass transfer over potential+electron transfer over potential+heterogeneous chemical reaction over potential+others). Therefore, the electrode reaction can be characterized as a resistance (or more correctly impedance) represented by a series of resistances for each process. In practice, a fast reaction step is characterized by a small resistance (impedance) and slow step by a high resistance. Removing heat from the process (minimize the thermodynamic contribution) exaggerates these resistances where electro-catalytic influences of g-CN can clearly be understood. Turning attention to FIG. 4, these fundamentals are easily observed at 0° C. comparing two cells; one with no g-CN (trace a) and one with (trace b). From previous discussion and examining the potential maxima and current density magnitude of the high and low order conversions, clearly trace b reveals much less sluggish response. Taking this to a practical level, one appreciates the broader utility of such an electro-catalyst in realistic environments.

Lithium sulfur conversion reactions exhibit a plurality of phase changes. Solid sulfur will only undergo lithiation if and only if the polysulfides are soluble in the supporting electrolyte—various stoichiometry from $Li_2S_8$ to $Li_2S_5$ or $S_7$, $Li_2S_4$ etc. and other disproportionation products. The polysulfides are mobile via Fickian type diffusion throughout the entire volume of the cell. As polysulfides diffuse away from the carbon network in the cathode, one observes a loss in capacity, one which is usually not recoverable. This loss in capacity is typically not recoverable because every Li+ gives 1 electron through heterogeneous charge transfer at the carbon/solution interface (cathode region of the cell). One aspect of the pnictide compounds disclosed herein is that their nitrogen hetero atom has the ability to retain or anchor polysulfides in the bulk of the composite cathode. We experimentally show this in FIG. 5. Without being bound by a specific theory or mechanism of action here, it is thought a lewis acid/base chemisorption interplay is happening here. Lithium polysulfides can be said to possess more acid character, conversely the pnictide with its nitrogen lone pair has more Lewis base character.

As discussed in the Examples below, we did not expect the graphitic carbon nitride materials to function as they do in view of their electronic properties. In particular, the function of the graphitic carbon nitride compositions in the methods and systems disclosed herein is surprising and unexpected because graphitic carbon nitride is an electronic insulator (in some cases semiconducting). Adding a material known to be an electronic insulator to the systems disclosed herein is counter intuitive to those skilled in the art in view of the expectation that internal electric resistance will "increase" making the total system less efficient. The findings disclosed herein are exactly opposite of what was expected; namely a total system impedance (charge transfer resistance) "decrease" in the presence of g-CN, an unexpected surprise.

Figure 11:
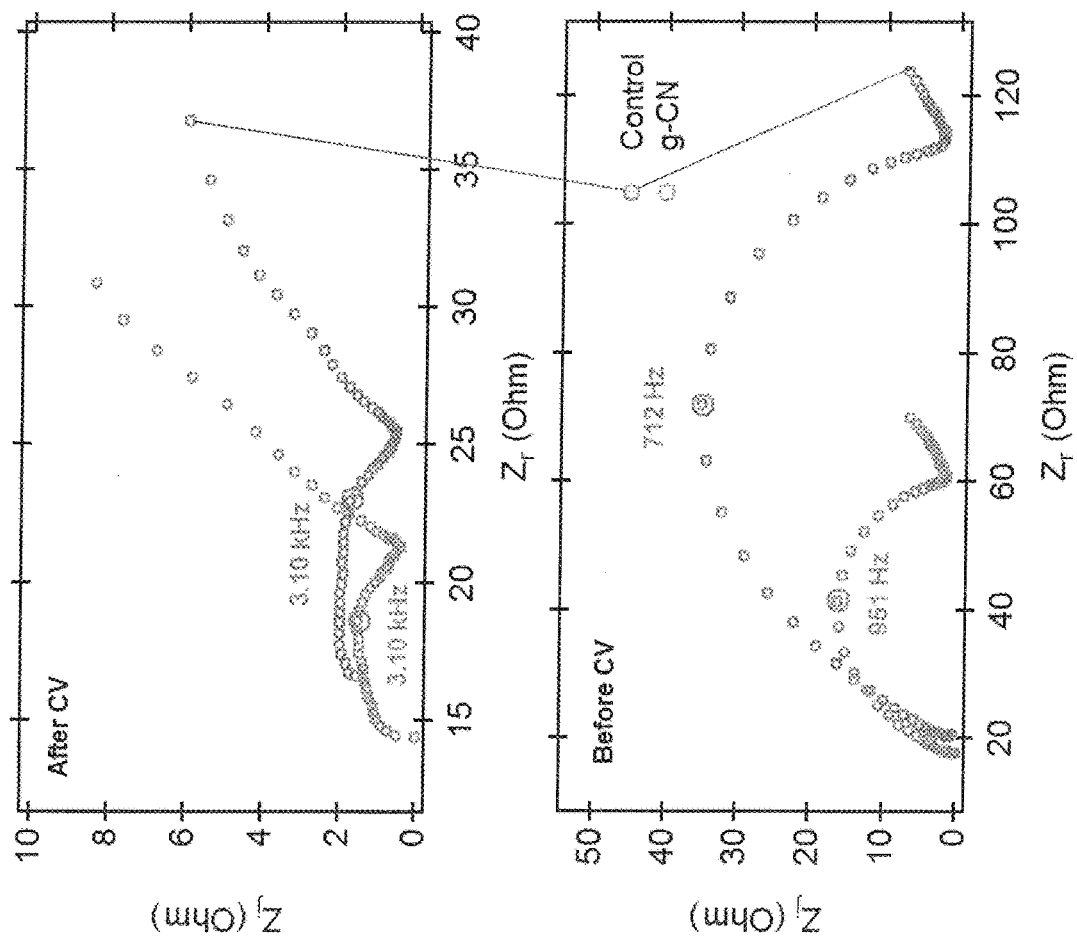
FIG. 11 provides characteristic two impedance plots showing lithium sulfur cells with and without gCN. These data illustrate a representative Nyquist impedance response of lithium sulfur cells having g-CN disposed in the cathode (replicates of those disclosed in FIG. 3) where the as-constructed cell spectra is collected at 24° C. after twelve hours at rest (lower graph) and after electrochemical biasing in the form of ten cyclic voltammetric scans between 1V and 3.5V at a scan rate of 1 mVs-1 (upper graph).

Graphitic carbon nitride materials disclosed herein consists of $sp^2$-hybridized carbon and nitrogen atoms showing a different electronic environment than that observed in other carbon-nitrogen compounds such as electron-conducting triphenylamines (see, e.g. U.S. Patent Publication No. 2014/0141328). Adding a material known to be an electronic insulator (g-CN) is counter intuitive by those skilled in the art because the expectation is that internal charge transfer resistance will "increase" making the total system less efficient. As shown by the graphical data in FIG. 11, we unexpectedly observe the opposite; namely a total system impedance (charge transfer resistance) "decrease" in the presence of g-CN. The impedance is opposite to what we expect as gCN is supposed to have no electrical conductivity. Thus we expect the gCN cell to show higher resistance since conductive carbon is diluted by 25 wt %. Instead, we see the gCN cell has lower impedance before and after cycling. All cells studied in the series shows the same trend, i.e. the impedance of cells with catalytic additive is always lower than the control (conductive carbon). Without being bound by a specific theory or mechanism of action, one reason why the gCN cells show lower cathodic impedance may lie in the fact the gCN has a very dense electron cloud from the high nitrogen content. In this context, the electron cloud may provide gCN with the observed catalytic features.

Heteroatom Modified Polytriazine Imides

As shown in Example 6 below, embodiments of the invention include methods for making and using compositions comprising an alkali metal halide immobilized within graphitic carbon nitride. These compositions are useful with certain battery embodiments of the invention. One such embodiment of the invention is a method of forming a composition of matter comprising an alkali metal halide immobilized within graphitic carbon nitride (g-CN-M). Such methods comprise combining a graphitic carbon nitride precursor with at least one alkali metal halide composition selected from the group consisting of LiC:KCl, LiBr:KBr, LiI:KI; and A wt % LiBr:KBr+B wt % LiI:KI, wherein A wt %+B wt %=100 wt %. In this method, the combination is then heated for at least 4 hours at a temperature of at least 500° C. but below 600° C. so as to form amorphous g-CN-M having a general formula:

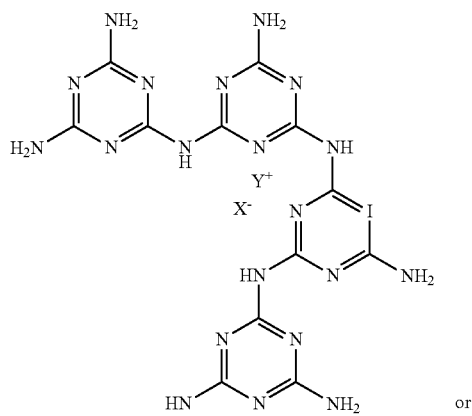

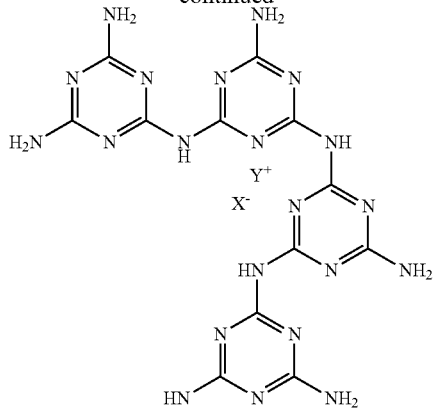

wherein $X^-$ is Iodine, Bromine or Chlorine, and $Y^+$ is Lithium or Potassium.

As is known in the art and disclosed for example in U.S. Pat. No. 7,807,124, graphitic carbon nitride can be formed from a variety of precursor molecules using various methods. Typically in the methods of the invention, the graphitic carbon nitride precursor is dicyandiamide, melamine, urea, thiourea, cyanuric acid or thiocyanuric acid. Typically the graphitic carbon nitride precursor and the alkali metal halide are combined in a grinding process. The graphitic carbon nitride precursor can be also combined with a number of other or additional compounds (e.g. CuBr, CsBr or NaBr). In certain embodiments of the invention, the combined materials are then heated, for example in a tube furnace under an inert atmosphere. Typically, the combination is heated for at least 4, 6, 8, 10 or 12 hours. Optionally, the alkali metal halide is heated for at least 4 hours at a temperature of at least 550° C. The methods can include additional steps, for example washing the composition after it is heated with an aqueous solution for at least 1, 4, 6 or 12 hours at a temperature of at least 90° C.

Certain illustrative reagents and methods in this technical field are disclosed in publications such as Chong et al. J. Mater. Chem. A, 2013, 1, 1102-1107; Boidys et al., Chem. Eur. J. 2008, 14, 8177-8182; Algra-Siller et al., Angew. Chem. 2014, 126, 1-6; and Ding et al., ChemCatChem 2013, 5, 1906-1910. In this context, embodiments of the invention can incorporate certain reagents and/or methodological steps known in the art including compositions such as eutectic mixtures of compounds such as LiBr and KBr ("LiBr:KBr"). Certain working embodiments of the invention used vacuum-dried LiBr and KBr as a raw material to form eutectic mixture. The ratio of compounds such as LiBr and KBr eutectic mixtures can be selected to modulate the melting point of these mixtures (e.g. to select the lowest melting point). In typical embodiments of the invention, the amount of LiX and KX compound used to form the mixture is between 40~60 wt %. Illustrative working embodiments of the invention utilize eutectic mixtures of LiCl:KCl (45:55 wt %, 20.5 g, Tm=352° C.), LiBr:KBr (52:48 wt %, 1.745 g, Tm=348° C.), or LiI:KI (58:42 wt %, 20.549 g, Tm=286.8° C.).

The disclosed methods are specifically designed to produce amorphous g-CN-M. Briefly, as is known in the art and disclosed for example in U.S. Pat. No. 6,428,762, in many materials, the manner in which the atoms forming the material are arranged determines many of the physical properties of that material. When carbon atoms in a compound such as g-CN-M are assembled randomly and not arranged in any ordered fashion the compound is termed "amorphous." In contrast, when the same carbon atoms align themselves in a crystal structure, the compound is termed "crystalline". In certain contexts, amorphous compounds are desirable while in other contexts, the crystalline form is desirable. In the amorphous compositions of the invention, the majority of the carbon atoms of the compound (e.g. 90, 95 or 99%) are in an amorphous configuration, i.e. not in a crystalline form.

Embodiments of the invention include composition of matter comprising g-CN-M formed by these methods. The g-CN-M compositions formed by these methods have desirable constellation of elements including desirable atomic structures. For example, in certain embodiments of the invention, the composition comprises an amount of K in the g-CN-M of at least 6 wt % and/or an amount of H in the g-CN-M of at least 1.5 wt %, and/or a C/N ratio in the g-CN-M of at least 0.72.

EXAMPLES

Illustrative Methods and Materials

Example 1: Nitrogen-Rich Tri-S-Triazine Based Graphitic Carbon Nitride (G-Cn) as a Heterogeneous Catalyst Sulfur-amine solution was employed as a inexpensive, less-hazardous sulfur precursor to synthesize metal sulfide nanocrystals.[6] Ammonium polysulfides generate $H_2S$ and intermediate species such as thioamide and amidine in the presence of excess amine at high temperatures (~130° C.). These sulfur species react with metal precursors to give the corresponding metal sulfides. Very recently, it was also shown that sulfur-amine solution enables the uniform deposition of sulfur onto the carbon nanostructure at a low temperature in a scalable manner[7] Ammonium polysulfides precipitates on the multi-walled carbon nanotube (MWNT) as a thin layer with a thickness of 6~7 nm simply by addition of diluted hydrochloric acids.

Figure 1B:
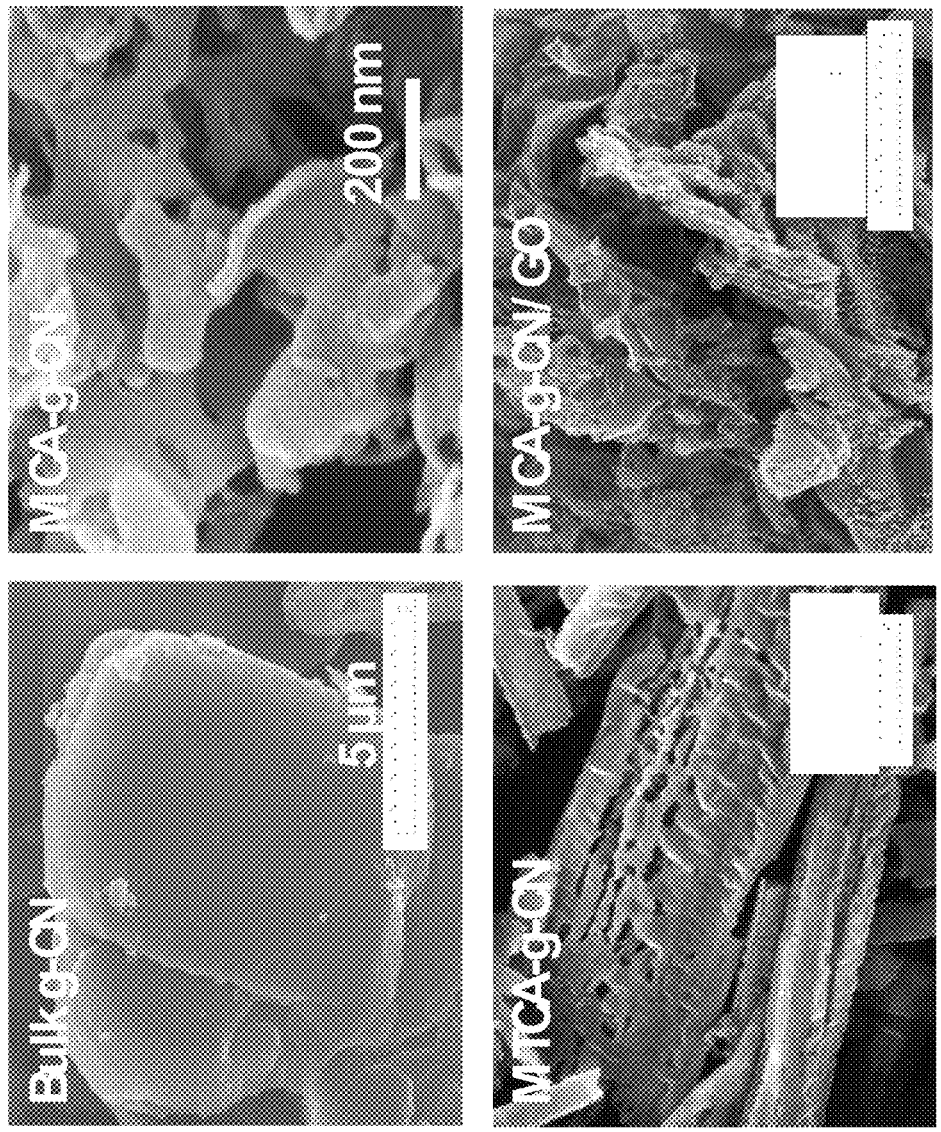
FIG. 1B provides SEM images of various analogues and morphologies of g-CNs.
Figure 2:
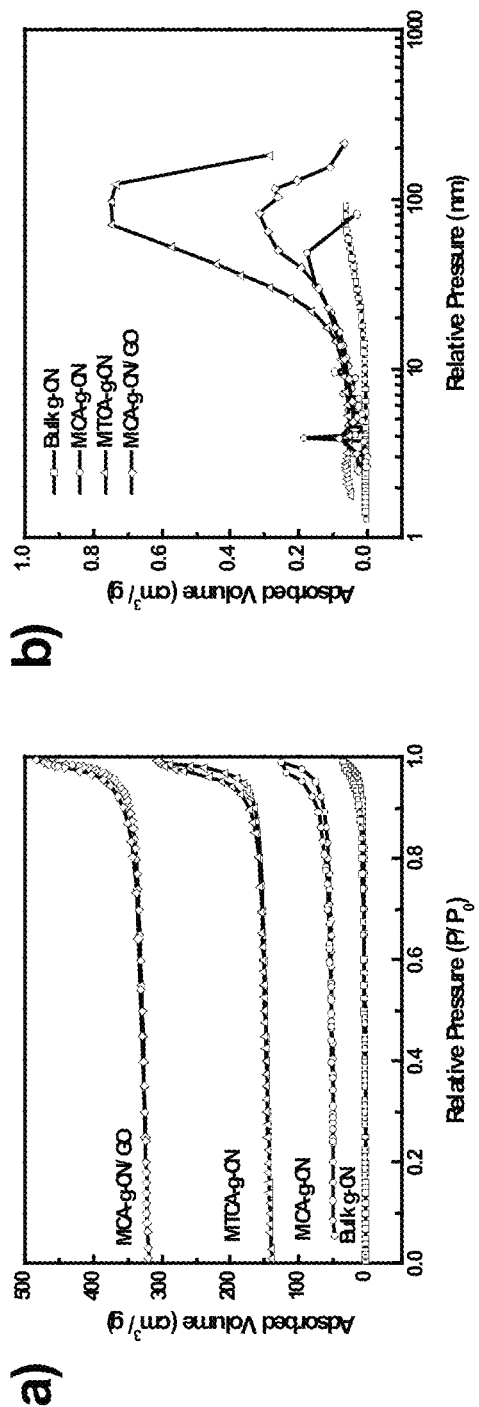
FIG. 2 provides data in graphical formats of nitrogen adsorption/desorption (a) isotherms; and (b) pore size distributions of g-CNs.

Of particular interest in amine-sulfur chemistry is that 1) the amine-sulfur complex helps to retain the linear polysulfides in the cathode structure via chemical bonding and 2) the reactive, linear intermediates facilitate the electrochemical reduction or oxidation between lithium and sulfur. Here, we utilize nitrogen-rich tri-s-triazine based graphitic carbon nitride (g-CN) as a heterogeneous catalyst. g-CN possess a plurality of amine functions (primary, secondary, and tertiary amines) whose contents are adjustable by controlling the degree of polymerization at different temperatures. g-CN is also well known as efficient electrocatalysts for both oxygen reduction (ORR) and oxygen evolution (OER) reactions.[8] As we frequently find similarity in catalytic activity of electrocatalyst for both $H_2O_{(2)}$ and $Li_2O_2$,[9] the electrocatalysis of $Li_2S$ with g-CN may follow the same trend along with the amine-sulfur chemistry.

g-CN electrocatalyst was prepared by heating various nitrogen-rich molecules, for example, dicyandiamide and melamine-(thio-)cyanuric acid complex (MCA or MTCA) at 550° C. (or 600° C.) under nitrogen atmosphere. Thermal polycondensation of the triazine molecules leads to the formation of tri-s-triazine connected by trigonal nitrogen and stacked in a graphitic fashion, so called, graphitic carbon nitride (g-CN). g-CN composite with graphene (MCA-g-CN/GO) was prepared by mixing the precursor molecules with graphene oxide (3 wt %) and then heating at 550° C. (or 600° C.) under nitrogen atmosphere. Thermal polycondensation of the nitrogen-rich molecules produces reductive species like ammonia and CNx gases which reduce insulating graphene oxide into highly conductive reduced graphene oxide at high temperatures. FIG. 1 shows SEM images of g-CN materials, bulk g-CN synthesized from dicyandiamide, nanosheet-assembled spheres (MCA-g-CN) and microfibers (MTCA-g-CN) and MCA-g-CN composite with graphene oxide (MCA-g-CN/GO). Sheet-like structures possess mesopores around 90~120 nm. (FIG. 2 and Table 1). Multipoint BET surface area of g-CN samples is 7~50 $m^2/g$ and a pore volume is ~0.25 $cm^3/g$. Note that the external surface of nanosheet is not included in the BET surface area calculated by $N_2$ sorption analysis. 2D sheet-like structure maximizes the utilization of internal trigonal nitrogen functions in g-CN, while the general mesoporous g-CN with high surface area allows the functional groups only at the external surface for electrocatalysis. Furthermore, open porous, 3D architecture is appropriate to accommodate the volume expansion by 230% resulting from the conversion of S, into $Li_2S$.

Example 2: Illustrative Electrochemical Cell Materials

Electrochemical Cell Materials: Consisted of standard ½" Swagelock™ type cells, utilized for basic electrochemical benchmarking, a common strategy known to practitioners in the art. All materials consisted of 316 stainless steel, polyimide film as the insulating sleeve, nylon ferrules and Whatman GF/D nonwoven glass fiber as the separator.

Electrolyte: Lithium polysulfide catholyte solutions ($Li_2S_8$ if not otherwise specified) were prepared by mixing stoichiometric amounts of Li metal (Alfa Aesar) and sulfur powder (99.99% Strem Chemical) in tetraethyleneglycol dimethyl ether (Acros Organics, fractionally vacuum distilled over mol sieves upon receipt), at 5 m. with respect to Li, and heated between 90-100° C. for several days or until all solids were dissolved. A working catholyte solution was prepared by diluting the concentrated lithium polysulfide solution with tetraethylene sulfone (Acros Organics, fractionally vacuum distilled over mol sieves upon receipt) to 0.11 m. and further dissolving lithium bis(trifluoromethanesulfonylimide) at 0.8 m. In examples where solid sulfur or lithium sulfide we employed in the composite cathode as the active material, lithium bis(trifluoromethanesulfonylimide) was dissolved in tetraethyleneglycol dimethyl ether and tetraethylene sulfone, keeping the same volumetric ratio as the catholyte example, yielding a 0.8 m. supporting electrolyte.

Cathode: Super P (Timcal) and Ketjen black (Asahi Kasei) were vacuum dried at 200° C. for 12 hours prior to use. Lithium sulfide (99.99%) and sulfur (99.99%) were used as received. Active material loading (solid sulfur, lithium polysulfide, lithium sulfide) was normalized to 2.4 $mgcm^{-2}$ if not otherwise specified.

Electrochemical half cell: Inside of an argon filled glove box, a Swagelock™ type cell was assembled with the following elements: Super P working electrode, lithium polysulfide catholyte and a lithium metal counter electrode. Cyclic voltammetry (CV) measurements were performed in the potential range 1.0~3.2 V vs. Li/Li shown as trace (a) in FIG. 3.

Example 3: Use of g-CN in Electrochemical Cells

The electrocatalytic activity of g-CN was first tested in heterogeneous system containing a catholyte. Following comparative example 2 protocol, two distinct Swagelock™ type cells where constructed; one having 25 wt % g-CN-2/75 wt % Super P and the other having 25 wt % g-CN-4/75 wt % Super P. g-CN was disposed in the conductive carbon by milling in a mortar/pastel for 15 minutes (b) 25 wt % g-CN-2/75 wt % Super P and (c) 25 wt % g-CN-4/75 wt % Super P. Cyclic voltammetry (CV) measurements were performed in the potential range 1.0~3.2 V vs. Li/Li shown as traces (b) and (c) respectively in FIG. 3.

Figure 3:
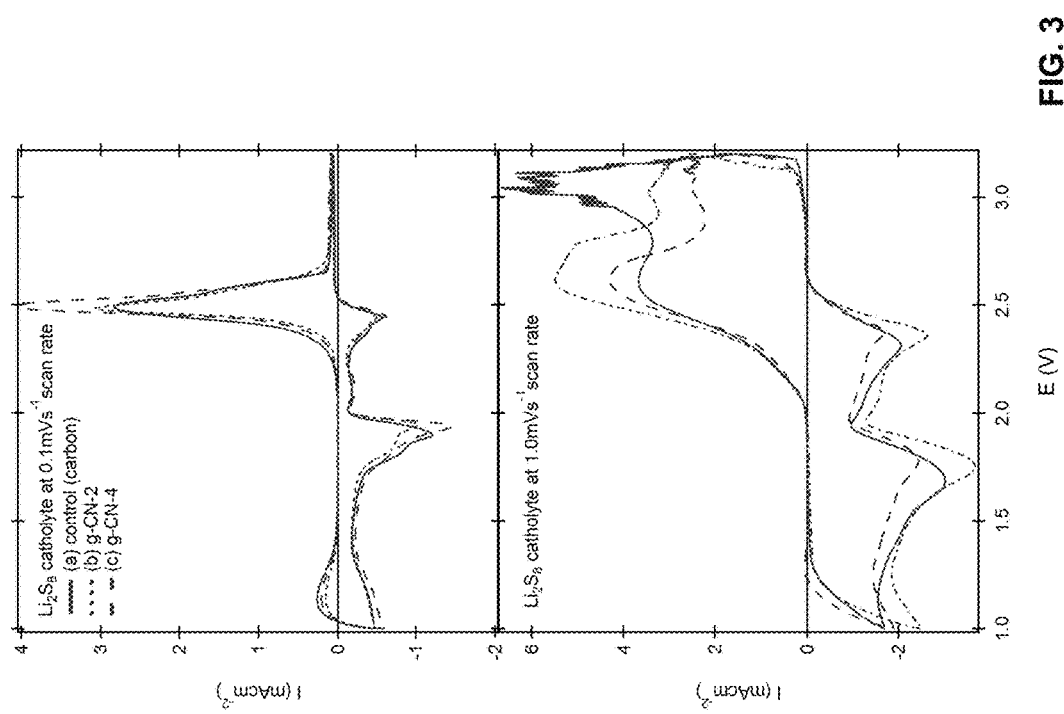
FIG. 3 provides data in graphical formats of cyclic voltammograms showing the second scan of a two-electrode lithium sulfur electrochemical Swagelok-Type™ cell at 24° C. having carbon mixed with various catalytic additives as the working electrode, lithium foil as the counter electrode and a lithium sulfide catholyte as the active sulfur source where trace (a) represents a characteristic control cell containing carbon in the working electrode, trace (b) represents carbon mixed with spherical graphitic carbon nitride and trace (c) carbon mixed with spherical graphitic carbon nitride/graphene composite.

The Super P and g-CN-2/Super P show nearly the same CV profiles at a slow scan rate (0.1 mVs$^{-1}$) with the exception that the second reduction peak of g-CN-2/Super P appears at a potential slightly higher than that of Super P (FIG. 3, top). The cathodic current observed around 1 V vs. Li/Li$^+$ results from the overpotential due to the strain/stress induced by the volume expansion during discharge. Integration of CV profile gives the discharge/charge capacity. Note that cyclic voltammetry measures the current response as a function of potential at a given scan rate. For $4^{th}$~$6^{th}$ cycles, the discharge capacity of g-CN-2/Super P is measured between 1,000~1,600 mAhg$^{-1}$ with respect to sulfur which is close to the theoretical value, g-CN-2/Super P cell has a discharge capacity similar to that of Super P. Capacity loss is about 25% after 6 cycles. At a faster scan rate (1.0 mVs$^{-1}$), the polarization between discharge and charge potential is less pronounced for g-CN-2/Super P cell. (FIG. 3 and Table 1) Furthermore, the diffusion limited current around 3.0 V vs. Li is remarkably depressed in the presence of g-CN-2 compared to the Super P control cell. This implies suppressed bulk diffusion of polysulfides. Combining this observation with the calculated high specific capacity strongly supports the hypothesis of polysulfide intermediate sorption to g-CN in the cathode region where Fickian type diffusion is minimized. Furthermore, graphene was composited with g-CN in order to enhance the electrical conductivity (g-CN-4). These conductive substrates enhance the reduction and oxidation current densities where there is no CV peak shift to the higher potential values (Table 2).

Example 4: Using G-Cn-2 to Accelerate Interfacial Charge Transfer Kinetics

Poor performance of Li-ion batteries at low temperatures can be attributed to the substantial internal electric resistance which is heavily dependent on temperature. g-CN-2 was, therefore, investigated to accelerate the interfacial charge transfer kinetics at lower temperatures during discharge. A baseline cell was constructed following example 1 protocol and a second cell following example 3 where the working electrode constitution was 55 wt % g-CN-2/45 wt % Super P g-CN-2. The cells were loaded into an environmental chamber and cooled to 0° C. After three hour temperature equilibration period, cyclic voltammetry (CV) measurements were performed in the potential range 1.0~3.5 V vs. Li/Li$^+$.

Comparing the redox peak shifts at 0° C. in Swagelok-Type™ cell, demonstrates a more dramatic shift of the high and low order reduction signatures (FIG. 4). It was unexpected to observe this since over half the electrically conductive carbon was substituted with electrically insulating g-CN-2. More simply, the electronic percolation of the working electrode was dramatically minimized, yet the reduction signatures reveal a more kinetically favorable system.

The control cell exhibits a small cathodic peak centered at ~2.1 V vs. Li/Li and a broad cathodic peak centered at ~1.5 V vs. Li/Li$^+$ (FIG. 4, trace a). These two peaks correspond to the reduction of elemental sulfur to high and low-order polysulfides, respectively. Presence of g-CN-2 in the cathode shifts both high and low-order reduction peaks toward more positive potentials (2.25V and 1.75 V vs. Li/Li) and increases the current density of high-order peak by a factor of ~2 (FIG. 4, trace b). The reduced magnitude of the redox peak splitting clearly demonstrates the enhanced charge transfer kinetics by g-CN-2 and thus catalytic effect. Increased current density of high-order peak probably again indicates the polysulfides retaining ability and improved utilization of sulfur at 0° C.

Example 5: Use of g-CN to Oxidize Crystalline Lithium Sulfide

Moving to a more practical electrode configuration where lithium foil is not required as the anode poses extreme kinetic challenges. Utilizing crystalline lithium sulfide as the active material enables access to a broader platform of application possibilities, safer characteristics in abuse conditions and catastrophic failures and reduces the demand on elemental lithium reserves (Table 3). The tradeoff with this approach is extreme overpotentials are needed to oxidize crystalline lithium sulfide, not only imposing unnecessary electrochemical stress on other cell components, but significant energy is wasted in the form of heat (ohmic resistance). This results in very poor utilization of sulfur near room temperatures (less than 10% of theoretical capacity).

Figure 5:
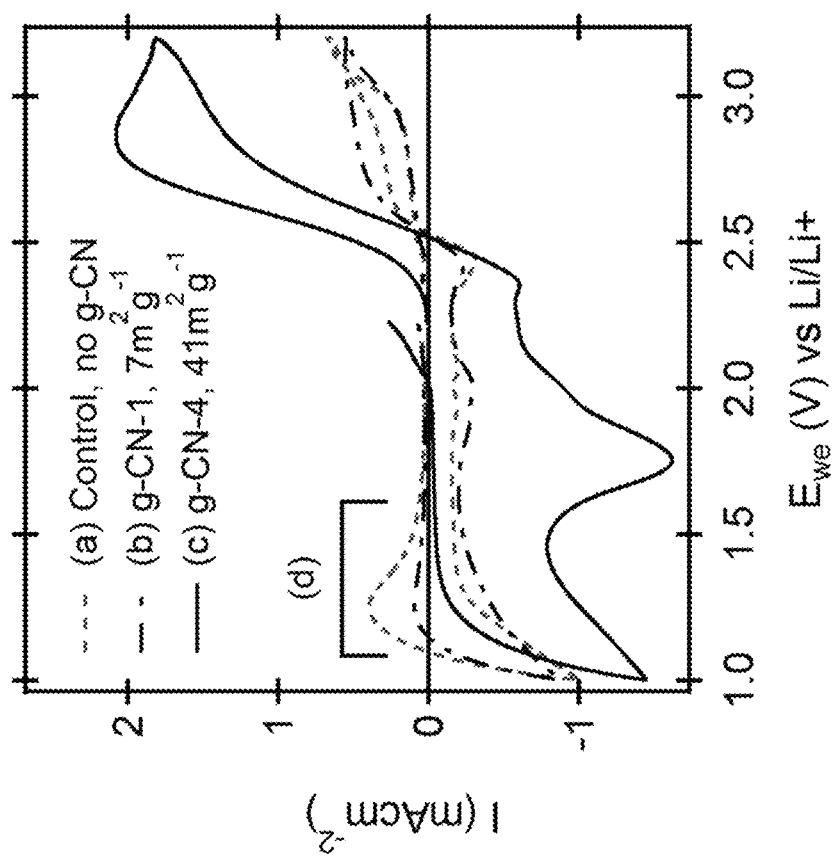
FIG. 5 provides data in graphical formats of cyclic voltammogram of a two-electrode lithium sulfur electrochemical Swagelok-Type™ cell having crystalline lithium sulfide and carbon as the working electrode and lithium foil as the counter electrode where this first scan was collected at 24° C. at a scan rate of 1 mVs-1. Trace (a) a control cell consisting of 45 wt % Li2S/55 wt % Super P, trace (b) a cell consisting of 25 wt % g-CN-1/45 wt % Li2S/30 wt % Super P and trace (c) a cell consisting of 25 wt % g-CN-3/45 wt % Li2S/30 wt % Super P. Region (d) demarcates the potential range of a redox active layer on the lithium counter electrode.

We further demonstrate a remarkable electrocatalytic feature of g-CN to oxidize crystalline lithium sulfide (FIG. 5). Using commercial, crystalline Li$_2$S microparticles deposed with two distinct forms of g-CN respectively having distinguishably different surface areas.

Following the general protocol of example 2, g-CN-1 and g-CN-4 were hand milled with lithium sulfide in a mortar/pestle for 15 minutes and then diluted with Super P and hand milled for another 15 minutes yielding a composite powder mass ratio of, lithium sulfide/gCN/Super P, 45/25/30. These powders where disposed as the working electrode of an electrochemical half-cells respectively while the baseline cell working electrode consisted of lithium sulfide/Super P, 45/55.

At 22° C., room temperature, cyclic voltammetry (CV) measurements were performed in the potential range 1.0~3.2 V vs. Li/Li$^+$ at a scan rate of 1.0 mVs$^{-1}$. g-CN-4 has an initial oxidation current density at 2.7 V vs. Li/Li$^+$, larger by a factor of three times those of Super P and g-CN-1 (FIG. 5) is quite remarkable in contrast to g-CN-1 and the baseline cell where no oxidation signature is observed. Oxidation potential shifts to the lower values and the current density decreases by 30% as the scan continues, while the baseline cell and g-CN-1 show the opposite trend. This can be attributed to the less contact area between Li$_2$S microparticles and g-CN-1 microparticles. Large particle size of g-CN-4 limits the electronic/electrical contact. Furthermore, the oxidation converts Li$_2$S into less volumetric S, and thus the remote charge transfer induces higher overpotential. The reduction potentials match well with those of previous observation, further supporting the hypothesis that the reversible reduction of the oxidized sulfur is possible in the successive cathodic scans. The reduction current density is quite stable over several cycles for g-CN-4. It is notable that the anodic current around 1.3 V vs. Li is not observed for g-CN-4 cells. Based on the assumption that this is related to the passivation of metallic Li anode by the intermediate polysulfides. This supports the hypothesis of sorption of soluble polysulfide intermediate species at the interface of g-CN-4.

Figure 6:
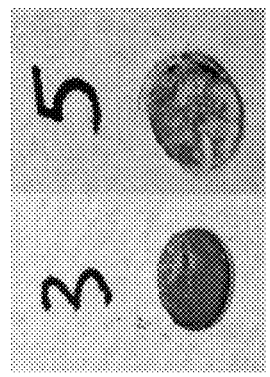
FIG. 6 provides digital photographs demonstrating representative surface of the lithium counter electrode after ten cyclic voltammetry scans; (3) was extracted from a control cell having no g-CN showing a thick reddish gray layer visually demonstrating precipitated lithium polysulfides known by those skilled in the art as one of the primary failure modes of this electrochemical couple while, (5) was extracted from a cell having g-CN dispersed in the working electrode showing no color change supporting the claim that lithium polysulfides are confined to the cathode region by a sorption mechanism.

Glyme based electrolytes, having soluble polysulfides, can form thick, porous electroactive film on lithium foil surfaces. These films account for low potential reversible capacity (demarcated in region d of FIG. 5) Attention should be focused on trace (c) showing a low oxidation feature while trace (b) reveals small, broad feature and trace (a) shows the largest low potential oxidation feature. Moreover, extracted lithium foil anodes from each cell revealed: a thick reddish/gray film on the anode from the cell shown by trace (a), a light gray, matte film on the anode from the cell shown by trace (b) and a reflective, silver metallic surface representative of pristine lithium on the anode from the cell shown by trace (c). (FIG. 6)

This can be rationalized by the amount of soluble polysulfides available in the bulk electrolyte. Soluble polysulfides can be thought of as the reactant or precursor to form the precipitated electroactive surface layer on lithium; polysulfides diffuse through the electrolyte from the cathode to the anode, when the reactant contacts the electrode surface, a chemical transformation occurs involving both glyme, the polysulfide and possibly the supporting electrolyte salt. The transformation yields a thermodynamically favorable decomposition composite of all said materials. The chemical structure and construct of this film is not well understood. Nonetheless, it is known that this decomposition product is only observed when soluble polysulfides are present in the bulk electrolyte. The implication of this is g-CN is restricting the diffusion of polysulfides into the bulk electrolyte by means of sorption to the surface of g-CN at nitrogen rich sites.

As shown above, embodiments of the invention are designed to address complicated aspects of lithium sulfur conversion reactions such as the plurality of phase changes. In particular, solid sulfur will only undergo lithiation if and only if the polysulfides are soluble in the supporting electrolyte—various stoichiometry from $Li_2S_8$ to $Li_2S_5$ or $S_7$, $Li_2S_4$ etc. and other disproportionation products. This introduces a problem in that the polysulfides are mobile via Fickian type diffusion throughout the entire volume of the cell. As polysulfides diffuse away from the carbon network in the cathode, one observes a loss in capacity, usually not recoverable. This is because every Li+ gives 1 electron through heterogeneous charge transfer at the carbon/solution interface. In this context, one beneficial aspect of the disclosed materials is that the nitrogen hetero atom in these compounds has the ability to retain or anchor polysulfides in the bulk of the composite cathode. We experimentally show this in FIG. 5, and without being bound by a particular theory or mechanism of action, it is thought a Lewis acid/base interplay is happening here. Lithium polysulfides can be said to possess more acid character, conversely the pnictide with its nitrogen lone pair is has more lewis base character (e.g. chemisorption)

Example 6: Illustrative Methods for Forming Alkali Metal Halides ($Li^+$, $K^+$ Cl—, Br—, and $I^+/I^-$) Incorporated Polytriazine Imide Lithium bromide dissolved in the electrolyte is known to catalyze the redox conversion between $S_8$ and $Li_2S$. However, its utility is limited by free Br severe corrosion activity on the stainless steel cell parts and metallic current collectors. In practice, lithium bromide is not deployed.

On the other hand, if free halide ions are immobilized, parasitic corrosion can be mitigated while leveraging the catalytic benefits of the ion. These criteria inspired a new material where lithium halides are immobilized within the gCN structure. The following describes the synthetic protocol to achieve alkali metal halides ($Li^+$, $K^+$ Cl—, Br—, and $I^+/I^-$) incorporated polytriazine imide (PTI-LiKX, X=Cl, Br or I).

Dicyandiamide (DCDA, 1 g) was ground with LiC:KCl (45:55 wt %, 20.5 g), LiBr:KBr (52:48 wt %, 1.745 g), or LiI:KI (58:42 wt %, 20.549 g) in a glove box. The mixture was transferred to a tube furnace and heated to 500~550° C. for 12 h under nitrogen without tempering. After cooling down to room temperature, the resulting material was washed with hot water at 90° C. for overnight, filtered, washed with water, and then dried at 110° C.

Figure 12:
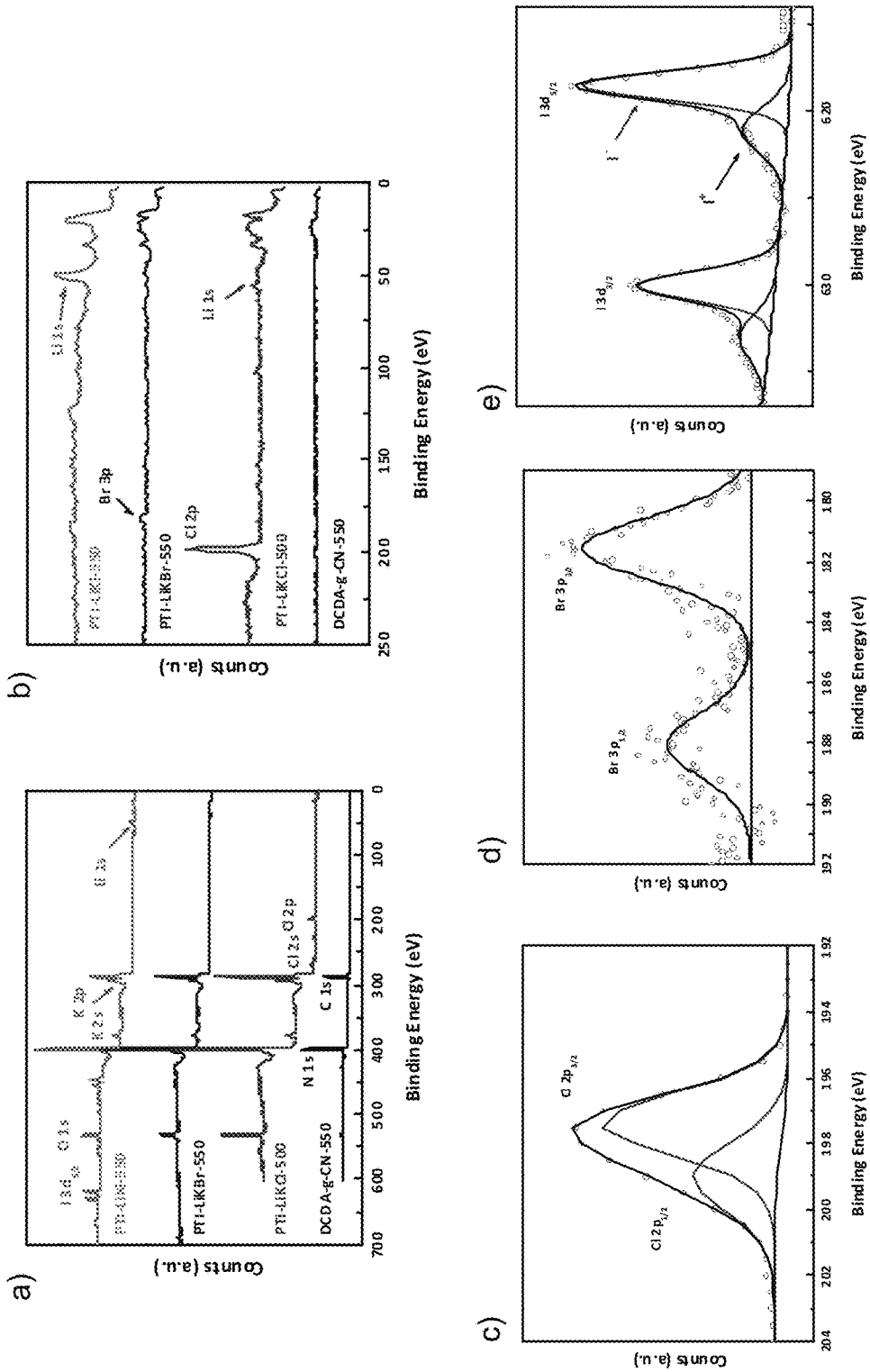
FIGS. 12A-12E provides data from X-ray photoelectron spectroscopy (XPS) spectra of alkali metal halides incorporated into polytriazine imide (PTI-LiKX, where X=Cl, Br or I).

X-ray photoelectron spectroscopy (XPS) analysis proves the incorporation of Li, K, and halogens into the PTI structures through polycondensation of dicyandiamide in eutectic mixtures of LiX:KX. (FIG. 12a,b) The characteristic peaks of Li 1s (~50 eV), K 2s (~378 eV) and halogens (Cl 2p at 198.5 eV, Br 3p at 182 eV and I 3d at 617 eV) were observed along with those of C 1s at 286 eV, N 1s at 397 eV and O 1s at 530 eV in survey spectra. The elemental contents of halogens were calculated to be 3.22 wt. % or 1.27 at. % of Cl for PTI-LiKCl-500, 0.73 wt. % or 0.13 at. % of Br for PTI-LiKBr-550 and 4.97 wt. % or 0.4 at. % of I for PTI-LiKI-550. It was estimated that PTI-LiKI-550 contains significant amount of Li (~29.90 wt. %), while those of Li in PTI-LiKCl-500 and PTI-LiKBr-550 were comparable to or lower than those of the crystalline analogues prepared at 600° C. estimated by inductively coupled plasma atomic emission spectroscopy (ICP-AES).[11,13] Furthermore, the content of K in PTI-LiKX was much higher (6~8 wt. % or 2~3 at. %) than those (~0.24 wt. %) of the crystalline analogues. This is, however, comparable to those (~5.66 at. % K, ~0.72 at. % I) of K doped g-CN prepared in KI at 550° C. estimated by X-ray fluorescence (XRF) spectroscopy.

Figure 13:
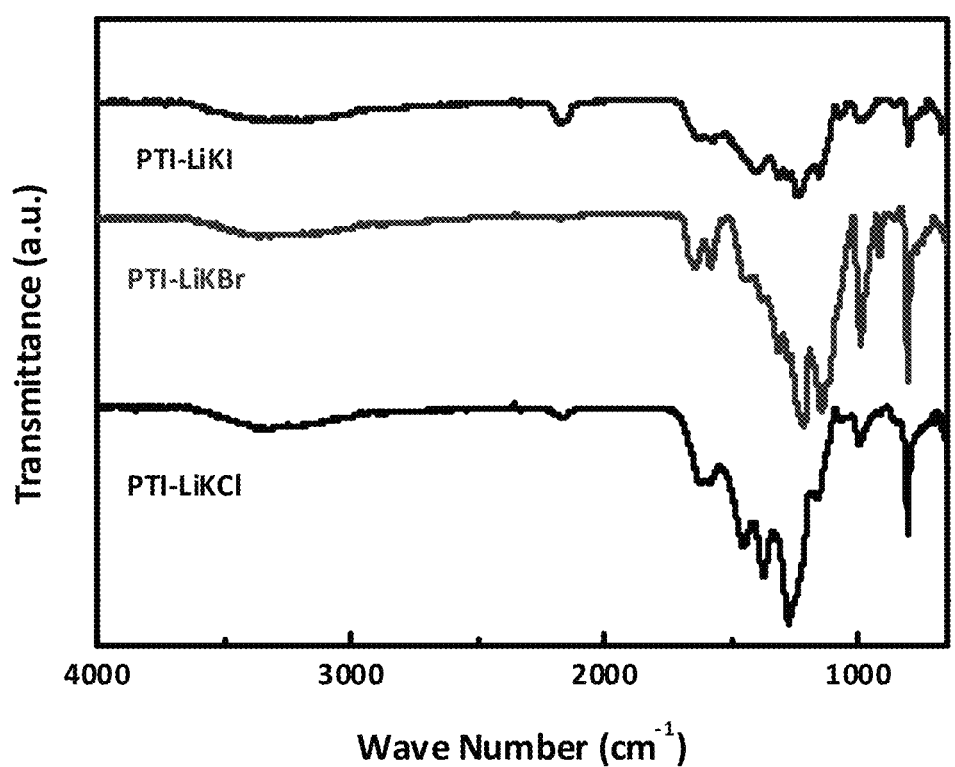
FIG. 13 provides data from Fourier transform infrared spectroscopy (FTIR) spectra of PTI-LiKX.

High resolution XPS spectra of Cl 2p and Br 3p reveal the ionic nature of Cl and Br whose oxidation states are the same with the eutectic precursors. (FIG. 12c-e) In contrast, the high resolution spectrum of I $3d_{5/2}$ is deconvoluted into the multiple peaks centered at 618.54 and 621.10 eV. This indicates the multi-valency of I (75 at. % as I⁻ and 25 at. % I⁺) probably resulting from the partial oxidation of I⁻ by donating electrons to the PTI structures. FT-IR spectra of PTI-LiKXs show a broad band of primary and/or secondary amine groups at 3000~3200 cm⁻¹. (FIG. 13) Elemental analysis (EA) supports the presence of terminal hydrogen (~2 wt. %). The content of hydrogen is higher by 2~3 times than that of the crystalline PTI-LiKCl-600 (0.67 wt. % H, C/N=0.71) and PTI-LiKBr-600 (0.97 wt. % H, C/N=0.67) prepared at 600° C. in a quartz glass ampoule,[11,13] although molar C/N ratios (—0.73) of PTI-LiKX, i.e. degree of polycondensation, were closer to that (0.75) of the ideal g-$C_3N_4$. Note that some defect sites are crucial for the surface redox reactions of photocatalysis.

Figure 14:
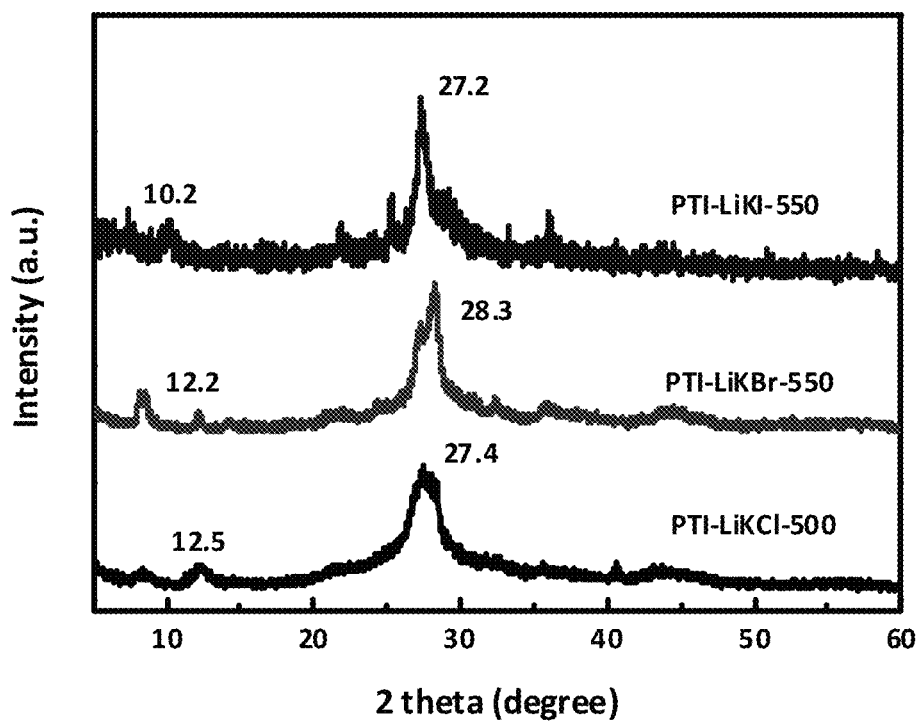
FIG. 14 provides data from powder X-Ray Diffraction patterns of PTI-LiKX.

A sharp band around 803 cm⁻¹ and multiple bands around 1100~1700 cm⁻¹ correspond to the out-of-plane breathing mode of triazine and stretching mode of CN heterocyclic ring, respectively. Both of them are gradually depressed in the order of Cl, Br<I. This may be attributed in part to decrease in the structural ordering resulting from substitution of N and/or incomplete polycondensation as the anion size increases: Cl⁻ (1.81 Å)<Br⁻ (1.96 Å)<I⁻ (2.20 Å). Relatively imperfect structure could be further confirmed by a band around 2160 cm⁻¹ corresponding to uncondensed cyano group. Powder X-ray diffraction (PXRD) patterns of PTI-LiKX also show that the in-plane period near 120, resulting from the trigonal voids spanned by triazine units, becomes less pronounced in the same order. (FIG. 14) Furthermore, the (002) peak at ~28° of the graphitic layers shifts to the lower scattering angles, meaning increase in the interlayer distance by adopting the larger anions. The consistent overall diffraction intensity, however, reveals that change in the crystal phase of PTI-LiKX is insignificant. Homogeneous distribution of Li, K, and X in PTI without losing the crystal structure is crucial for synergistic tuning of the chemical and electronic properties.

TABLES

TABLE 1

Summary of g-CN structures and their textural properties.

| Descriptive name | Material | $S_{BET}$ (cm$^2$/g) | Pore Volume (cm$^3$/g) | Description |
|---|---|---|---|---|
| g-CN-1 | Bulk g-CN | 7 | — | Bulk graphitic carbon nitride synthesized from dicyandiamide |
| g-CN-2 | MCA-g-CN | 51 | 0.1 | Spherical graphitic carbon nitride synthesized from melamine-cyanuric acid complex |
| g-CN-3 | MTCA-g-CN | 32 | 0.25 | Fiber-like graphitic carbon nitride synthesized from melamine-trithiocyanuric acid complex |
| g-CN-4 | MCA-g-CN/GO | 41 | 0.24 | Spherical graphitic carbon nitride composite with graphene |

TABLE 2

Oxidation-reduction peak splitting from the second cyclic voltammetry scan at 1.0 mVs$^{-1}$ of a two-electrode lithium sulfur electrochemical Swagelok-type ™ (spectra shown in FIG. 3). Reduction proceeds by two characteristic phases: "high order" designates the reduction of sulfur to long chain polysulfides and "low order" designates the reduction of long chain lithium polysulfides to precipitous short chain polysulfides.

| Cell | $\Delta E_P$ (mV) high order $|E_{pc} - E_{pa1}|$ | low order $|E_{pc} - E_{pa2}|$ |
|---|---|---|
| Control | 290 | 920 |
| g-CN-2 | 230 | 830 |
| g-CN-4 | 253 | 858 |

TABLE 3

Illustrative cell elements and associated materials.

| CELL ELEMENT | CELL ELEMENT MATERIAL | COMMENTS |
|---|---|---|
| A = ANODE | Li metal (+sulfur) - most common<br>Graphite (+lithium sulfide)<br>Graphene (+lithium sulfide)<br>Silicon/graphene (+lithium sulfide)<br>Silicon (+lithium sulfide)<br>Tin (+lithium sulfide) | Lithium needs to be used with sulfur while others like Si, Sn etc . . . can be used with lithium sulfide which can be more effective in terms of cost, safety and resource utilization. |
| B = SEPARATOR (not so important here) | Generic polypropylene or polyethylene, will have part numbers later | N/a |
| C = COMPOSITE CATHODE - multiple ways a lithium sulfur cell can be constructed with GCN | Sulfur + carbon + binder + GCN (needs lithiated anode)<br>Lithium sulfide + carbon + binder + GCN (no lithium in anode needed) | There are many ways to construct a composite cathode with either lithium sulfide or sulfur as the active material: constituent ratios, particle sizes, composite porosity, composite film thickness, active material loading |
| D = ELECTROLYTE | Solvent: ethers, glymes, certain carbonates and ionic liquids<br>Salts: LiPF6, LiTFSI, LiFSI<br>Additive LiNO3 | We will use state of the art here - nothing much we can add other than marrying with GCN |

TABLE 3-continued

Illustrative cell elements and associated materials.

| CELL ELEMENT | CELL ELEMENT MATERIAL | COMMENTS |
|---|---|---|
| E = NEW LAYER COMPRISING GCN | GCN could be fabricated into a film held together with polymer binder Used as interlayer between B and C | The interlayer approach has been tried but only with carbon, no with any other material |

TABLE 4

Element content in PTI-LiKX calculated from survey scan of XPS spectra.

| | wt % | | | | | | | | |
|---|---|---|---|---|---|---|---|---|---|
| Material | C | N | O | Li | K | Cl | Br | I | total |
| DCDA-550 | 41.15 | 55.42 | 3.43 | — | — | — | — | — | |
| PTI-LiKCl-500 | 34.31 | 45.34 | 9.54 | 1.54 | 6.04 | 3.22 | — | — | 100 |
| PTI-LiKBr-550 | 31.55 | 49.86 | 9.49 | — | 8.38 | — | 0.73 | — | 100 |
| PTI-LiKI-550 | 24.06 | 27.69 | 6.28 | 29.90 | 7.10 | — | — | 4.97 | 100 |

TABLE 5

N content in PTI-LiBr-550 and PTI-LiI-550 calculated from high resolution N1s XPS spectra.

| | Position (eV) | | | Area (%) | | |
|---|---|---|---|---|---|---|
| Material | C—N=C | C—N3 | C—N—H(2) | C—N=C | C—N3 | C—N—H(2) |
| PTI-LiKBr-550 | 398.24 | 400.22 | 403.44 | 61.42 | 29.41 | 9.17 |
| PTI-LiKI-550 | 398.63 | 399.1 | 401.2 | 40.9 | 49.28 | 9.82 |

TABLE 6

C, N, H content in PTI-LiKX estimated by elemental analysis.

| | Wt. % | | | |
|---|---|---|---|---|
| Sample | C | N | H | C/N |
| PTI-LiKCl-500 | 27.68 | 43.97 | 1.90 | 0.73 |
| PTI-LiKBr-550 | 27.72 | 45.20 | 2.01 | 0.72 |
| PTI-LiKI-550 | 25.69 | 41.60 | 1.69 | 0.72 |

All numbers recited in the specification and associated claims that refer to values that can be numerically characterized with a value other than a whole number (e.g. a unit of measurement such as a concentration of a component in a composition) are understood to be modified by the term "about". Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Furthermore, all publications mentioned herein are incorporated herein by reference to disclose and describe the methods and/or materials in connection with which the publications are cited. Publications cited herein are cited for their disclosure prior to the filing date of the present application. Nothing here is to be construed as an admission that the inventors are not entitled to antedate the publications by virtue of an earlier priority date or prior date of invention. Further the actual publication dates may be different from those shown and require independent verification.

It is to be understood that this invention is not limited to the particular embodiments described, as such may, of course, vary. It is also to be understood that the terminology used herein is for the purpose of describing particular embodiments only, and is not intended to be limiting, since the scope of the present invention will be limited only by the appended claims. In the description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

REFERENCES (1) R. E. Davis, Nakshben. H f, Journal of the American Chemical Society 1962, 84, 2085-&.
(2) K. Okamoto, T. Yamamoto, T. Kanbara, Synlett 2007, 2687-2690.

(3) Y. Sasaki, F. P. Olsen, Canadian Journal of Chemistry 1971, 49, 283-&; W. G. Hodgson, S. A. Buckler, G. Peters, Journal of the American Chemical Society 1963, 85, 543-&.
(4) P. D. Bartlett, R E. Davis, Journal of the American Chemical Society 1958, 80, 2513-2516; P. D. Bartlett, E. F. Cox, R E. Davis, Journal of the American Chemical Society 1961, 83, 103–+; P. D. Bartlett, G. Lohaus, C. D. Weis, Journal of the American Chemical Society 1958, 80, 5064-5069.
(5) M. W. Wong, K. B. Wiberg, Journal of the American Chemical Society 1992, 114, 7527-7535; K. I. Priyadarsini, H. Mohan, Journal of Photochemistry and Photobiology a-Chemistry 1995, 85, 63-67.
(6) J. W. Thomson, K. Nagashima, P. M. Macdonald, G. A. Ozin, Journal of the American Chemical Society 2011, 133, 5036-5041.
(7) C. Wang, H. Chen, W. Dong, J. Ge, W. Lu, X. Wu, L. Guo, L. Chen, Chemical Communications 2014.
(8) X. Wang, K. Maeda, A. Thomas, K. Takanabe, G. Xin, J. M. Carlsson, K. Domen, M. Antonietti, Nature Materials 2009, 8, 76-80; J. Liang, Y. Zheng, J. Chen, J. Liu, D. Hulicova-Jurcakova, M. Jaroniec, S. Z. Qiao, Angewandte Chemie-International Edition 2012, 51, 3892-3896; Y. Zhao, R. Nakamura, K. Kamiya, S. Nakanishi, K. Hashimoto, Nature Communications 2013, 4; K. Maeda, X. C. Wang, Y. Nishihara, D. L. Lu, M. Antonietti, K. Domen, Journal of Physical Chemistry C 2009, 113, 4940-4947.
(9) R. Black, J. H. Lee, B. Adams, C. A. Mims, L. F. Nazar, Angewandte Chemie-International Edition 2013, 52, 392-396.
(10) Understanding the Nature of Absorption/Adsorption in Nanoporous Polysulfide Sorbents for the Li—S Battery, Scott Evers, Taeeun Yim, and Linda F. Nazar, J. Phys. Chem. C 2012, 116, 19653.
(11) Lithium-Sulfur Batteries Based on Nitrogen-Doped Carbon and an Ionic-Liquid Electrolyte, Xiao-Guang Sun, Xiqing Wang, Richard T. Mayes, and Sheng Dai, ChemSusChem 2012, 5(10), 2079.
(12) Stable cycling of lithium sulfide cathodes through strong affinity with a bifunctional binder, Zhi Wei Seh, Qianfan Zhang, Weiyang Li, Guangyuan Zheng, Hongbin Yao, Yi Cui, Chem. Sci. 2013, 4, 3673.
(13) From Melamine-Cyanuric Acid Supramolecular Aggregates to Carbon Nitride Hollow Spheres, Young-Si Jun, Eun Zoo Lee, Xinchen Wang, Won Hi Hong, Galen D. Stucky and Arne Thomas, Adv. Funct. Mater. 2013, 23(29), 3661.

The invention claimed is:

1. A lithium-sulfur electrochemical cell comprising:
an anode;
a sulfur-carbon cathode;
a separator disposed between the anode and the cathode;
an electrolyte solution;
sulfur; and
a graphitic carbon nitride having the formula:

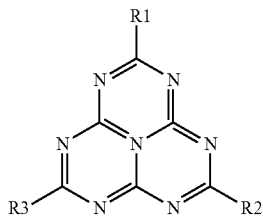

wherein:
R1, R2 and R3 are each independently:
(a) —NH$_2$;
(b) —NH—R4; or
(c) —N—(R4)$_2$; wherein R4 is:

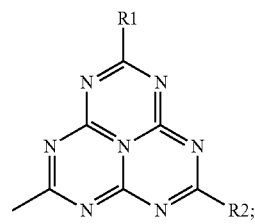

and
the graphitic carbon nitride compound has an electrical conductivity<1×10$^{-7}$ cm/s; and
the cathode is formed from a composite material comprising graphitic carbon nitride, sulfur, conductive carbon nanoparticles and a polymeric material.

2. The lithium-sulfur electrochemical cell of claim 1, further comprising a membrane disposed between the separator and the cathode, wherein the membrane comprises graphitic carbon nitride.

3. The lithium-sulfur electrochemical cell of claim 1, wherein the graphitic carbon nitride is disposed in a composite material comprising at least one of: reduced graphene oxide, graphene oxide, and at least one conducting polymer selected from the group consisting of polyaniline, polypyrrole, polythiphene and poly(3,4-ethylenedioxythiophene.

4. The lithium-sulfur electrochemical cell of claim 1, wherein the graphitic carbon nitride is doped with at least one of: sulfur, carbon, phosphorus, or boron.

5. The lithium-sulfur electrochemical cell of claim 1, wherein the lithium-sulfur electrochemical cell is a full electrochemical cell.

6. The lithium-sulfur electrochemical cell of claim 1, wherein the electrolyte solution comprises at least one of: glyme, an ether, a phosphate, a fluoride, a tetrafluoroborate, a bis(trifluoromethanesulfonyl)imide, a bis(fluorosulfonyl) imide, a nitrate, a cyanate, a pyridinic, a thiocyanzte alkali, and an alkaline earth metal salt.

7. The lithium-sulfur electrochemical cell of claim 1, wherein:
the lithium-sulfur electrochemical cell generates lithium polysulfides; and
the graphitic carbon nitride is disposed in the lithium-sulfur electrochemical cell so that the lithium polysulfides contact and bind the graphitic carbon nitride.

8. The lithium-sulfur electrochemical cell of claim 1, wherein the graphitic carbon nitride is disposed at a location in the lithium-sulfur battery so as to:
(a) act as a sorbent to attract soluble polysulfides and limit their bulk diffusion into the electrolyte solution;
(b) catalyze oxidation-reduction reactions of a lithium sulfur catholyte;
(c) catalyze oxidation-reduction of a crystalline lithium sulfide;
(d) catalyze oxidation-reduction of a crystalline sulfur; or
(e) reduce electrode charge transfer resistance.

9. A lithium-sulfur battery comprising:
an anode;
a sulfur-carbon cathode;
a separator disposed between the anode and the cathode;

an electrolyte solution;
sulfur; and
a graphitic carbon nitride having the formula:

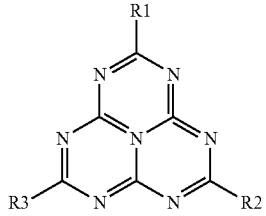

wherein:
R1, R2 and R3 are each independently:
(a) —NH$_2$,
(b) —NH—R4; or
(c) —N—(R4)$_2$; wherein R4 is:

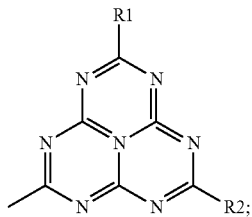

and
the graphitic carbon nitride is disposed at a location within the lithium-sulfur battery that allows the graphitic carbon nitride to function as a catalyst of redox electrochemical reactions within the lithium-sulfur battery.

10. The lithium-sulfur battery of claim 9, wherein:
the electrochemical cell generates lithium polysulfides; and
the graphitic carbon nitride in the electrochemical cell catalyzes the oxidization or reduction of the lithium polysulfides.

11. The lithium-sulfur battery of claim 9, wherein the graphitic carbon nitride functions to decrease charge transfer resistance within the electrochemical cell.

12. The lithium-sulfur battery of claim 9, wherein:
the lithium-sulfur electrochemical cell further comprises a membrane disposed between the separator and the cathode; and
the membrane comprises graphitic carbon nitride.

13. The lithium-sulfur battery of claim 9, wherein the cathode is formed from a composite material comprising graphitic carbon nitride.

14. The lithium-sulfur battery of claim 10, wherein the cathode is formed from a composite material comprising sulfur.

15. A lithium-sulfur electrochemical cell comprising:
an anode;
a sulfur-carbon cathode;
a separator disposed between the anode and the cathode;
a catholyte solution comprising solubilized lithium polysulfides; and
a graphitic carbon nitride having the formula:

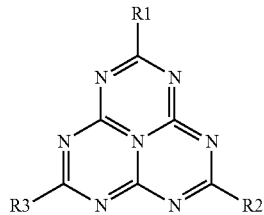

wherein:
R1, R2 and R3 are each independently:
(a) —NH$_2$
(b) —NH—R4; or
(c) —N—(R4)$_2$; wherein R4 is:

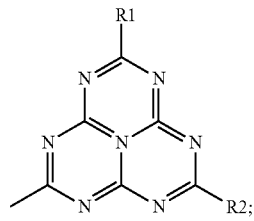

and
the graphitic carbon nitride is in contact with the catholyte solution comprising solubilized lithium polysulfides.

16. The lithium-sulfur electrochemical cell of claim 15, wherein the graphitic carbon nitride functions to lower cathodic impedance within the electrochemical cell.

17. The lithium-sulfur electrochemical cell of claim 16, wherein the graphitic carbon nitride functions as a catalyst of redox electrochemical reactions within the electrochemical cell.

18. The lithium-sulfur electrochemical cell of claim 17, wherein the cathode comprises the graphitic carbon nitride is bound with a polymer and disposed within a conductive carbon matrix.

* * * * *